US010355312B2

(12) United States Patent
Arima et al.

(10) Patent No.: US 10,355,312 B2
(45) Date of Patent: Jul. 16, 2019

(54) ELECTROLYTE AND ELECTROCHEMICAL DEVICE

(71) Applicant: DAIKIN INDUSTRIES, LTD., Osaka-shi, Osaka (JP)

(72) Inventors: Hiroyuki Arima, Osaka (JP); Hideo Sakata, Osaka (JP); Shigeaki Yamazaki, Osaka (JP); Shinichi Kinoshita, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 99 days.

(21) Appl. No.: 15/127,849

(22) PCT Filed: Mar. 24, 2015

(86) PCT No.: PCT/JP2015/058961
§ 371 (c)(1),
(2) Date: Sep. 21, 2016

(87) PCT Pub. No.: WO2015/147000
PCT Pub. Date: Oct. 1, 2015

(65) Prior Publication Data
US 2017/0104240 A1   Apr. 13, 2017

(30) Foreign Application Priority Data

Mar. 27, 2014   (JP) .................. 2014-067014

(51) Int. Cl.
*H01M 10/0569* (2010.01)
*H01G 11/60* (2013.01)
*H01G 11/64* (2013.01)
*H01M 10/0567* (2010.01)
*H01G 11/62* (2013.01)
*H01M 10/0525* (2010.01)

(52) U.S. Cl.
CPC ........ *H01M 10/0569* (2013.01); *H01G 11/60* (2013.01); *H01G 11/62* (2013.01); *H01G 11/64* (2013.01); *H01M 10/0525* (2013.01); *H01M 10/0567* (2013.01); *H01M 2300/0034* (2013.01); *H01M 2300/0037* (2013.01); *Y02E 60/13* (2013.01); *Y02T 10/7011* (2013.01); *Y02T 10/7022* (2013.01)

(58) Field of Classification Search
CPC ......... H01M 10/0569; H01M 10/0567; H01M 10/0525; H01M 2300/0034; H01M 2300/0037; Y02E 60/13; H01G 11/62; H01G 11/60; H01G 11/64
See application file for complete search history.

(56) References Cited

U.S. PATENT DOCUMENTS 6,033,809 A    3/2000  Hamamoto et al.
9,209,479 B2*  12/2015 Hiwara .............. H01M 10/0569
2003/0148191 A1    8/2003  Mori et al.
2004/0234851 A1   11/2004  Kim et al.
2008/0145763 A1    6/2008  Koh et al.
2009/0086408 A1    4/2009  Koh et al.
2009/0226808 A1    9/2009  Hiwara et al.
2009/0253048 A1*  10/2009  Shima ............... H01M 10/0567
                                                        429/338
2009/0291364 A1   11/2009  Koh et al.
2010/0062344 A1*   3/2010  Koh .................. H01M 10/0567
                                                        429/330
2010/0209785 A1    8/2010  Kawashima
2011/0123871 A1    5/2011  Nakagawa et al.
2011/0159382 A1    6/2011  Matsui et al.
2012/0100436 A1*   4/2012  Inoue ............... H01M 10/0567
                                                        429/332
2013/0171514 A1    7/2013  Mio et al.
2013/0316229 A1   11/2013  Sawa et al.
2014/0023916 A1    1/2014  Koh et al.
2015/0037668 A1    2/2015  Iwaya et al.

FOREIGN PATENT DOCUMENTS

| CN | 1574427    A  | 2/2005  |
| CN | 101120474  A  | 2/2008  |
| CN | 101156215  A  | 4/2008  |
| CN | 101330139  A  | 12/2008 |
| CN | 101960662  A  | 1/2011  |
| CN | 102084534  A  | 6/2011  |
| CN | 102496466  A  | 6/2012  |
| CN | 102637901  A  | 8/2012  |
| CN | 102903958  A  | 1/2013  |
| EP | 2 031 689  A1 | 3/2009  |
| EP | 2302714    A1 | 3/2011  |
| JP | 10-189042  A  | 7/1998  |
| JP | 2000-003724 A | 1/2000  |
| JP | 2002-319430 A | 10/2002 |
| JP | 2002-329528 A | 11/2002 |
| JP | 2003-197253 A | 7/2003  |

(Continued)

OTHER PUBLICATIONS

Communication dated Aug. 22, 2017, from the European Patent Office in counterpart European Application No. 15768017.4.

(Continued)

Primary Examiner — Laura Weiner
(74) Attorney, Agent, or Firm — Sughrue Mion, PLLC

(57) ABSTRACT

The present invention provides an electrolyte solution that is capable of dealing with an increased voltage of an electrochemical device, as well as capable of improving the high-temperature storage characteristics and cycle characteristics of the electrochemical device, and an electrochemical device. The electrolyte solution includes a solvent containing a fluorinated saturated cyclic carbonate and a fluorinated acyclic carbonate; at least one sulfur-containing compound selected from the group consisting of compounds having a —$SO_2$— bond, compounds having a —$SO_3$— bond, and compounds having a —$SO_4$— bond, and an electrolyte salt. The fluorinated acyclic carbonate has a fluorine content of 31.0 to 70.0 mass %.

6 Claims, No Drawings

(56) References Cited

FOREIGN PATENT DOCUMENTS

| JP | 2005-293920 A | 10/2005 |
|----|---------------|---------|
| JP | 2006-294519 A | 10/2006 |
| JP | 2007-250415 A | 9/2007 |
| JP | 2007-305352 A | 11/2007 |
| JP | 2009-170146 A | 7/2009 |
| JP | 2010-257805 A | 11/2010 |
| JP | 2011-054490 A | 3/2011 |
| JP | 2012-178339 A | 9/2012 |
| JP | 51-92237 B2 | 5/2013 |
| JP | 5192237 B2 | 5/2013 |
| JP | 2014-022328 A | 2/2014 |
| JP | 2014-35866 A | 2/2014 |
| JP | 2015-056312 * | 3/2015 |
| WO | 2013/183719 A1 | 12/2013 |
| WO | WO 2015/026180 * | 2/2015 |

OTHER PUBLICATIONS

International Preliminary Report on Patentability, dated Sep. 27, 2016, from the International Bureau in counterpart International application No. PCT/JP2015/058961.

Communication dated Nov. 23, 2017 from the European Patent Office in counterpart application No. 15768017.4.

International Search Report of PCT/JP2015/058961 dated Jun. 2, 2015.

\* cited by examiner

ELECTROLYTE AND ELECTROCHEMICAL DEVICE

CROSS REFERENCE TO RELATED APPLICATIONS

This application is a National Stage of International Application No. PCT/JP2015/058961, filed Mar. 24, 2015, claiming priority based on Japanese Patent Application No. 2014-067014, filed Mar. 27, 2014, the contents of all of which are incorporated herein by reference in their entirety.

TECHNICAL FIELD

The present invention relates to electrolyte solutions and electrochemical devices.

BACKGROUND ART

Current electric appliances demonstrate a tendency to have a reduced weight and a smaller size, which leads to development of electrochemical devices, such as lithium ion secondary batteries, having a high energy density. Further, electrochemical devices such as lithium ion secondary batteries are used in more various fields, and thus are desired to have improved characteristics. In particular, improvement of battery characteristics of lithium ion secondary batteries will become a more and more important factor when the batteries are put in use for automobiles.

Lithium ion secondary batteries need to have various characteristics, such as initial capacity, rate characteristics, cycle characteristics, high-temperature storage characteristics, low-temperature characteristics, continuous charge characteristics, self-discharge characteristics, and overcharge prevention characteristics. For the purpose of improving these characteristics, methods for incorporating various additives into an electrolyte solution have been proposed.

For example, Patent Literature 1 discloses a non-aqueous electrolyte solution containing a specific unsaturated sultone as an invention intended to suppress decomposition of a solvent on a negative electrode, thereby suppressing a decrease in capacity of a battery, generation of gas, and deterioration in load characteristics of the battery during high-temperature storage.

Patent Literature 2 discloses, as an invention intended to improve the high-temperature characteristics, an electrolyte solution containing a solvent and an electrolyte salt, wherein the solvent contains a cyclic carbonate ester derivative having a halogen atom and a specific sulfur-containing compound.

Patent Literature 3 discloses, as an invention intended to improve the continuous charge characteristics, a non-aqueous electrolyte solution including a lithium salt dissolved in a non-aqueous organic solvent, wherein the non-aqueous organic solvent contains a cyclic carbonate having a fluorine substituent and/or a carbon-carbon unsaturated bond, and the non-aqueous electrolyte solution contains 0.001 to 1.5 wt % of a cyclic anhydride and 0.001 to 10 wt % of a S=O group-containing organic compound relative to the weight of the non-aqueous electrolyte solution.

Patent Literature 4 discloses, as an invention intended to improve both the storage characteristics and the cycle characteristics, a non-aqueous electrolyte solution including a lithium salt dissolved in a non-aqueous organic solvent, wherein the non-aqueous organic solvent contains a fluorine-substituted cyclic carbonate, and the non-aqueous electrolyte solution contains a diisocyanate and one or more sulfur compounds selected from the group consisting of sulfoxides, sulfites, sulfones, sulfonates, sultones, and sulfates.

Patent Literature 5 discloses, as an invention intended to improve the cycle characteristics, the electric capacity, the storage characteristics in a charged state, and other properties, a lithium secondary battery including a positive electrode, a negative electrode, and a non-aqueous electrolyte solution containing an electrolyte dissolved in a non-aqueous solvent, wherein the positive electrode is a material containing a lithium complex oxide, the negative electrode is a material containing graphite, and the non-aqueous solvent contains a cyclic carbonate and an acyclic carbonate as main components and contains 0.1 wt % or more and 4 wt % or less of 1,3-propane sultone and/or 1,4-butane sultone.

Patent Literature 6 discloses, as an invention intended to suppress capacity degradation occurred together with the progress of charge and discharge cycles, an electrolyte solution for lithium secondary batteries including a lithium salt as a solute, a specific cyclic organosulfate, and an organic solvent that dissolves the lithium salt, wherein the cyclic organosulfate is contained at a concentration of 0.1 to 50 wt % in the electrolyte solution.

Patent Literature 7 discloses, as an invention intended to improve the discharge characteristics at low temperatures, a non-aqueous electrolyte secondary battery including, in a non-aqueous electrolyte, at least one specific vinylene carbonate derivative at a concentration of 1 wt % or less and at least one specific glycol sulfate derivative at a concentration of 2 wt % or less.

Patent Literature 8 discloses, as an invention intended to suppress a decrease in capacity in a high-temperature environment and in a low-temperature environment and to suppress an increase in thickness of a battery in a high-temperature environment, a non-aqueous electrolyte battery including a positive electrode that contains a positive electrode active material capable of occluding and releasing lithium ions, a negative electrode that contains a negative electrode active material capable of occluding and releasing lithium ions, and a non-aqueous electrolyte, wherein the non-aqueous electrolyte contains one or more cyclic organosulfate derivatives and one or more fluorinated ether compounds.

CITATION LIST

Patent Literature

Patent Literature 1: JP 2002-329528 A
Patent Literature 2: JP 2006-294519 A
Patent Literature 3: JP 2011-54490 A
Patent Literature 4: JP 2012-178339 A
Patent Literature 5: JP 2000-3724 A
Patent Literature 6: JP H10-189042 A
Patent Literature 7: JP 2003-197253 A
Patent Literature 8: JP 2005-293920 A

SUMMARY OF INVENTION

Technical Problem

Electrochemical devices, such as lithium ion secondary batteries, need to have an increased voltage so as to achieve a higher energy density when applied to uses requiring a high capacity power supply, such as vehicles. Thus, there is a demand for an electrolyte solution that is capable of dealing with an increased voltage, as well as capable of improving various characteristics of electrochemical devices.

The present invention is devised in consideration of the above state of the art, and aims to provide an electrolyte solution that is capable of dealing with an increased voltage of an electrochemical device, as well as capable of improving the high-temperature storage characteristics and cycle characteristics of the electrochemical device, and an electrochemical device.

Solution to Problem

The present inventors found that an electrolyte solution including a solvent that contains a fluorinated saturated cyclic carbonate and a fluorinated acyclic carbonate can be applied to electrochemical devices such as high-voltage batteries, and can improve the characteristics such as cycle characteristics. Then, the inventors found that use of a specific sulfur-containing compound together with a solvent containing a fluorinated saturated cyclic carbonate and a fluorinated acyclic carbonate whose fluorine content is controlled within a specific range enables further improvement of the high-temperature storage characteristics and the cycle characteristics of electrochemical devices. Thereby, the inventors have arrived at the present invention.

Specifically, the present invention relates to an electrolyte solution including a solvent that contains a fluorinated saturated cyclic carbonate and a fluorinated acyclic carbonate; at least one sulfur-containing compound selected from the group consisting of compounds having a —$SO_2$— bond, compounds having a —$SO_3$— bond, and compounds having a —$SO_4$— bond; and an electrolyte salt, the fluorinated acyclic carbonate having a fluorine content of 31.0 to 70.0 mass %.

The sulfur-containing compound is preferably an unsaturated sultone represented by the following formula (1):

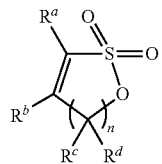

(1)

wherein $R^a$ to $R^d$ may be the same as or different from each other, and are each a hydrogen atom, a fluorine atom, or a C1-C12 hydrocarbon group which may optionally have a fluorine atom; and n is an integer of 0 to 3.

Preferably, the proportion of the fluorinated saturated cyclic carbonate is 3 to 97 vol % and the proportion of the fluorinated acyclic carbonate is 3 to 97 vol % relative to the solvent.

Preferably, the sum of the proportions of the fluorinated saturated cyclic carbonate and the fluorinated acyclic carbonate is 6 to 100 vol % relative to the solvent.

The present invention also relates to an electrochemical device comprising the above electrolyte solution.

The present invention also relates to a lithium ion secondary battery comprising the above electrolyte solution.

The present invention also relates to a module comprising the above electrochemical device or the above lithium ion secondary battery.

Advantageous Effects of Invention

The electrolyte solution of the present invention is capable of dealing with an increased voltage of electrochemical devices, as well as capable of improving the high-temperature storage characteristics and cycle characteristics of electrochemical devices. Since an electrochemical device including the above electrolyte solution has a high voltage and is excellent in high-temperature storage characteristics and cycle characteristics, the electrochemical device is suitably used in applications such as onboard devices.

DESCRIPTION OF EMBODIMENTS

The present invention will be described in detail below.

The electrolyte solution of the present invention contains a solvent.

The solvent contains a fluorinated saturated cyclic carbonate.

The fluorinated saturated cyclic carbonate is a saturated cyclic carbonate having a fluorine atom. Specific examples thereof include a fluorinated saturated cyclic carbonate (A) represented by the following formula (A):

(A)

wherein $X^1$ to $X^4$ may be the same as or different from each other, and are each —H, —$CH_3$, —F, a fluorinated alkyl group which may optionally have an ether bond, or a fluorinated alkoxy group which may optionally have an ether bond, at least one of $X^1$ to $X^4$ being —F, a fluorinated alkyl group which may optionally have an ether bond, or a fluorinated alkoxy group which may optionally have an ether bond.

Containing the fluorinated saturated cyclic carbonate (A) enables, when the electrolyte solution of the present invention is applied to a lithium ion secondary battery, for example, formation of a stable film on the negative electrode, sufficiently suppressing side reactions of the electrolyte solution on the negative electrode. This results in significantly stable, excellent charge and discharge characteristics.

The term "ether bond" herein means a bond represented by —O—.

In order to achieve a good permittivity and oxidation resistance, one or two of $X^1$ to $X^4$ in the formula (A) is/are preferably —F, a fluorinated alkyl group which may optionally have an ether bond, or a fluorinated alkoxy group which may optionally have an ether bond.

In anticipation of a decrease in viscosity at low temperatures, an increase in flash point, and improvement in solubility of the electrolyte salt, $X^1$ to $X^4$ in the formula (A) are each preferably —H, —F, a fluorinated alkyl group (a), a fluorinated alkyl group (b) having an ether bond, or a fluorinated alkoxy group (c).

The fluorinated alkyl group (a) is an alkyl group in which at least one hydrogen atom is replaced by a fluorine atom. The fluorinated alkyl group (a) preferably has a carbon number of 1 to 20, more preferably 2 to 17, still more preferably 2 to 7, particularly preferably 2 to 5.

If the carbon number is too large, the low-temperature characteristics may be poor and the solubility of the electrolyte salt may be low. If the carbon number is too small, the solubility of the electrolyte salt may be low, the discharge efficiency may be low, and the viscosity may be high, for example.

Examples of the fluorinated alkyl group (a) which has a carbon number of 1 include $CFH_2-$, $CF_2H-$, and $CF_3-$.

In order to achieve a good solubility of the electrolyte salt, preferred examples of the fluorinated alkyl group (a) which has a carbon number of 2 or greater include fluorinated alkyl groups represented by the following formula (a-1):

$$R^1\text{-}R^2- \quad (a\text{-}1)$$

wherein $R^1$ is an alkyl group which may optionally have a fluorine atom and which has a carbon number of 1 or greater; and $R^2$ is a C1-C3 alkylene group which may optionally have a fluorine atom, at least one of $R^1$ and $R^2$ having a fluorine atom.

$R^1$ and $R^2$ each may further have an atom other than carbon, hydrogen, and fluorine atoms.

$R^1$ is an alkyl group which may optionally have a fluorine atom and which has a carbon number of 1 or greater. $R^1$ is preferably a C1-C16 linear or branched alkyl group. The carbon number of $R^1$ is more preferably 1 to 6, still more preferably 1 to 3.

Specifically, for example, $CH_3-$, $CH_3CH_2-$, $CH_3CH_2CH_2-$, $CH_3CH_2CH_2CH_2-$, and groups represented by the following formulas:

may be mentioned as linear or branched alkyl groups for $R^1$.

If $R^1$ is a linear alkyl group having a fluorine atom, examples thereof include $CF_3-$, $CF_3CH_2-$, $CF_3CF_2-$, $CF_3CH_2CH_2-$, $CF_3CF_2CH_2-$, $CF_3CF_2CF_2-$, $CF_3CH_2CF_2-$, $CF_3CH_2CH_2CH_2-$, $CF_3CF_2CH_2CH_2-$, $CF_3CH_2CF_2CH_2-$, $CF_3CF_2CF_2CH_2-$, $CF_3CF_2F_2CF_2-$, $CF_3CF_2CH_2CF_2-$, $CF_3CH_2CH_2CH_2CH_2-$, $CF_3CF_2CH_2CH_2CH_2-$, $CF_3CH_2CF_2CH_2CH_2-$, $CF_3CF_2CF_2CH_2CH_2-$, $CF_3CF_2CF_2OF_2CH_2-$, $CF_3CF_2CH_2CF_2CH_2-$, $CF_3CF_2CH_2CH_2CH_2CH_2-$, $CF_3CF_2CF_2CF_2CH_2CH_2-$, $CF_3CF_2CH_2CF_2CH_2CH_2-$, $HCF_2-$, $HCF_2CH_2-$, $HCF_2CF_2-$, $HCF_2CH_2CH_2-$, $HCF_2CF_2CH_2-$, $HCF_2CH_2CF_2-$, $HCF_2CF_2CH_2CH_2-$, $HCF_2CH_2CF_2CH_2-$, $HCF_2CF_2CF_2-$, $HCF_2CF_2CH_2CH_2CH_2-$, $HCF_2CH_2CF_2CH_2CH_2-$, $HCF_2CF_2CF_2CH_2-$, $HCF_2CF_2CF_2CF_2CH_2-$, $FCH_2-$, $FCH_2CH_2-$, $FCH_2CF_2-$, $FCH_2CF_2CH_2-$, $FCH_2CF_2CF_2-$, $CH_3CF_2CH_2-$, $CH_3CF_2CF_2-$, $CH_3CH_2CH_2-$, $CH_3CF_2CH_2CF_2-$, $CH_3CF_2CF_2CF_2-$, $CH_3CH_2CF_2CF_2-$, $CH_3CF_2CH_2CF_2CH_2-$, $CH_3CF_2CF_2CF_2CH_2-$, $CH_3CH_2CF_2CF_2CH_2-$, $CH_3CF_2CH_2CF_2CH_2CH_2-$, $HCFClCF_2CH_2-$, $HCF_2CFClCH_2-$, $HCF_2CFClCF_2CFClCH_2-$, and $HCFClCF_2CFClCF_2CH_2-$.

If $R^1$ is a branched alkyl group having a fluorine atom, those represented by the following formulas:

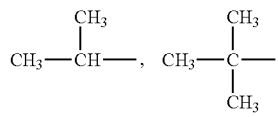

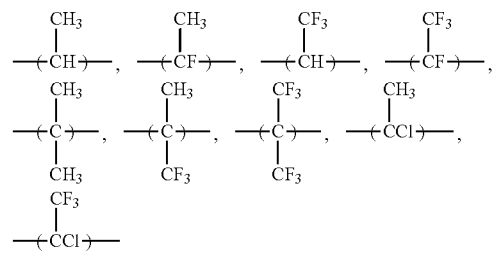

may be preferably mentioned. However, a branch such as $-CH_3$ or $-CF_3$ is likely to increase the viscosity. Thus, the number of such branches is more preferably small (one) or zero.

$R^2$ is a C1-C3 alkylene group which may optionally have a fluorine atom. $R^2$ may be a linear or branched group. Examples of a minimum structural unit constituting such a linear or branched alkylene group are shown below. $R^2$ is constituted by one or a combination of these units.

(i) Linear Minimum Structural Units $-CH_2-, -CHF-, -CF_2-, -CHCl-,$
$-CFCl-, -CCl_2-$ (ii) Branched Minimum Structural Units

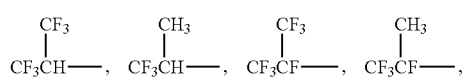

Preferred among these exemplified units are Cl-free structural units because such units are not dehydrochlorinated by a base, and thus are more stable.

If $R^2$ is a linear group, the group consists only of any of the above linear minimum structural units, and it is preferably $-CH_2-$, $-CH_2CH_2-$, or $CF_2-$. In order to further improve the solubility of the electrolyte salt, $-CH_2-$ or $-CH_2CH_2-$ is more preferred.

If $R^2$ is a branched group, the group includes at least one of the above branched minimum structural units. Preferred examples thereof include those represented by the formula: —(CX$^a$X$^b$)— (wherein X$^a$ is H, F, CH$_3$, or CF$_3$; and X$^b$ is CH$_3$ or CF$_3$, if X$^b$ is CF$_3$, X$^a$ is H or CH$_3$). Such groups can further improve the solubility of the electrolyte salt.

For example, CF$_3$CF$_2$—, HCF$_2$CF$_2$—, H$_2$CFCF$_2$—, CH$_3$CF$_2$—, CF$_3$CF$_2$CF$_2$—, HCF$_2$CF$_2$CF$_2$—, H$_2$CFCF$_2$CF$_2$—, CH$_3$CF$_2$CF$_2$—, and those represented by the following formulas:

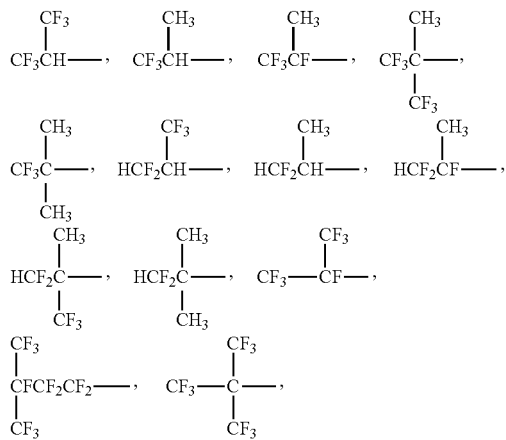

may be mentioned as a preferred fluorinated alkyl group (a).

The fluorinated alkyl group (b) having an ether bond is an alkyl group which has an ether bond and in which at least one hydrogen atom is replaced by a fluorine atom. The fluorinated alkyl group (b) having an ether bond preferably has a carbon number of 2 to 17. If the carbon number is too large, the fluorinated saturated cyclic carbonate (A) may have a high viscosity and also have an increased number of fluorine-containing groups. This may cause poor solubility of the electrolyte salt due to a decrease in permittivity and poor compatibility with other solvents. Accordingly, the carbon number of the fluorinated alkyl group (b) having an ether bond is preferably 2 to 10, more preferably 2 to 7.

The alkylene group which constitutes the ether segment of the fluorinated alkyl group (b) having an ether bond may be a linear or branched alkylene group. Examples of a minimum structural unit constituting such a linear or branched alkylene group are shown below.

(i) Linear Minimum Structural Units

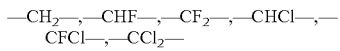

(ii) Branched Minimum Structural Units

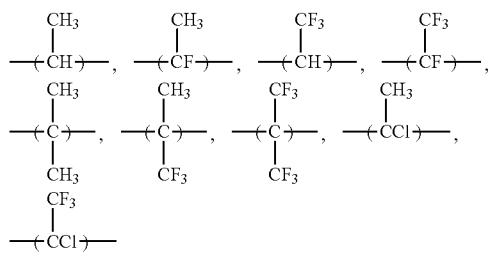

The alkylene group may be constituted by one of these minimum structural units alone, or may be constituted by a combination of linear units (i), of branched units (ii), or of a linear unit (i) and a branched unit (ii). Preferred examples will be mentioned in detail later.

Preferred among these exemplified units are Cl-free structural units because such units are not dehydrochlorinated by a base, and thus are more stable.

Still more preferred examples of the fluorinated alkyl group (b) having an ether bond include those represented by the following formula (b-1):

$$R^3—(OR^4)_{n1}— \quad (b-1)$$

wherein R$^3$ is an alkyl group which preferably has a carbon number of 1 to 6 and which may optionally have a fluorine atom; R$^4$ is an alkylene group which preferably has a carbon number of 1 to 4 and which may optionally have a fluorine atom; and n1 is an integer of 1 to 3, at least one of R$^3$ and R$^4$ having a fluorine atom.

Examples of the groups for R$^3$ and R$^4$ include the following, and any appropriate combination of these groups can provide the fluorinated alkyl group (b) having an ether bond represented by the formula (b-1). Still, the groups are not limited thereto.

(1) R$^3$ is preferably an alkyl group represented by the following formula: X$^c_3$C—(R$^5$)$_{n2}$—, wherein three X$^c$'s may be the same as or different from each other, and are each H or F; R$^5$ is a C1-C5 alkylene group which may optionally have a fluorine atom; and n2 is 0 or 1.

If n2 is 0, R$^3$ may be CH$_3$—, CF$_3$—, HCF$_2$—, or H$_2$CF—, for example.

If n2 is 1, specific examples of linear groups for R$^3$ include CF$_3$CH$_2$—, CF$_3$CF$_2$—, CF$_3$CH$_2$CH$_2$—, CF$_3$CF$_2$CH$_2$—, CF$_3$CF$_2$CF$_2$—, CF$_3$CH$_2$CF$_2$—, CF$_3$CH$_2$CH$_2$CH$_2$—, CF$_3$CF$_2$CH$_2$CH$_2$—, CF$_3$CH$_2$CF$_2$CH$_2$—, CF$_3$CF$_2$CF$_2$CH$_2$—, CF$_3$CF$_2$CF$_2$CF$_2$—, CF$_3$CF$_2$CH$_2$CF$_2$—, CF$_3$CH$_2$CH$_2$CH$_2$CH$_2$—, CF$_3$CF$_2$CH$_2$CH$_2$CH$_2$—, CF$_3$CH$_2$CF$_2$CH$_2$CH$_2$—, CF$_3$CF$_2$CF$_2$CH$_2$CH$_2$—, CF$_3$CF$_2$CF$_2$CF$_2$CH$_2$—, CF$_3$CF$_2$CH$_2$CF$_2$CH$_2$—, CF$_3$CF$_2$CF$_2$CF$_2$CH$_2$CH$_2$—, CF$_3$CF$_2$CH$_2$CF$_2$CH$_2$—, HCF$_2$CH$_2$—, HCF$_2$CF$_2$—, HCF$_2$CH$_2$CH$_2$—, HCF$_2$CF$_2$CH$_2$—, HCF$_2$CH$_2$CF$_2$—, HCF$_2$CF$_2$CH$_2$CH$_2$—, HCF$_2$CH$_2$CF$_2$CH$_2$—, HCF$_2$CF$_2$CF$_2$CF$_2$—, HCF$_2$CF$_2$CH$_2$CH$_2$—, HCF$_2$CH$_2$CF$_2$CH$_2$CH$_2$—, HCF$_2$CF$_2$CF$_2$CH$_2$—, HCF$_2$CF$_2$CF$_2$CF$_2$CH$_2$CH$_2$—, FCH$_2$CH$_2$—, FCH$_2$CF$_2$—, FCH$_2$CF$_2$CH$_2$—, CH$_3$CF$_2$—, CH$_3$CH$_2$—, CH$_3$CF$_2$CH$_2$—, CH$_3$CF$_2$CF$_2$—, CH$_3$CH$_2$CH$_2$—, CH$_3$CF$_2$CH$_2$CF$_2$—, CH$_3$CF$_2$CF$_2$CF$_2$—, CH$_3$CH$_2$CF$_2$CF$_2$—, CH$_3$CH$_2$CH$_2$CH$_2$—, CH$_3$CF$_2$CH$_2$CF$_2$CH$_2$—, CH$_3$CF$_2$CF$_2$CF$_2$CH$_2$—, CH$_3$CF$_2$CF$_2$CH$_2$CH$_2$—, CH$_3$CH$_2$CF$_2$CF$_2$CH$_2$—, CH$_3$CF$_2$CH$_2$CF$_2$CH$_2$CH$_2$—, and CH$_3$CH$_2$CF$_2$CF$_2$CH$_2$CH$_2$—.

If n2 is 1, those represented by the following formulas:

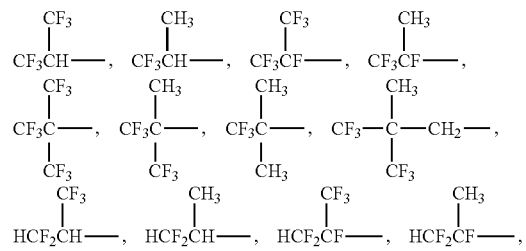

-continued

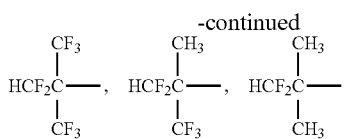

may be mentioned as examples of branched groups for $R^3$.

However, a branch such as —$CH_3$ or —$CF_3$ is likely to increase the viscosity. Thus, the group for $R^3$ is more preferably a linear group.

(2) In the segment —$(OR^4)_{n1}$— of the formula (b-1), n1 is an integer of 1 to 3, preferably 1 or 2. If n1 is 2 or 3, $R^4$'s may be the same as or different from each other.

Preferred specific examples of the group for $R^4$ include the following linear or branched groups.

Examples of the linear groups include —$CH_2$—, —CHF—, —$CF_2$—, —$CH_2CH_2$—, —$CF_2CH_2$—, —$CF_2CF_2$—, —$CH_2CF_2$—, —$CH_2CH_2CH_2$—, —$CH_2CH_2CF_2$—, —$CH_2CF_2CH_2$—, —$CH_2CF_2CF_2$—, —$CF_2CH_2CH_2$—, —$CF_2CF_2CH_2$—, —$CF_2CH_2CF_2$—, and —$CF_2CF_2CF_2$—.

Those represented by the following formulas:

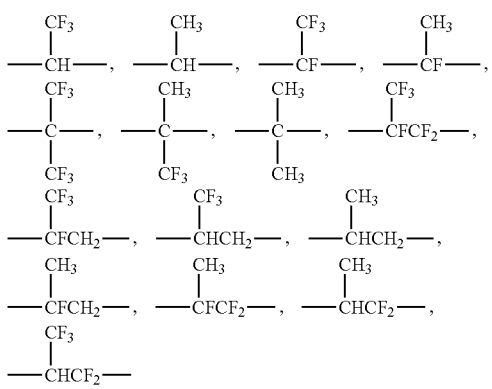

may be mentioned as examples of the branched groups.

The fluorinated alkoxy group (c) is an alkoxy group in which at least one hydrogen atom is replaced by a fluorine atom. The fluorinated alkoxy group (c) preferably has a carbon number of 1 to 17. The carbon number is more preferably 1 to 6.

The fluorinated alkoxy group (c) is particularly preferably a fluorinated alkoxy group represented by the formula: $X^{d3}C$—$(R^6)_{n3}$-O—, wherein three $X^{d}$'s may be the same as or different from each other, and are each H or F; $R^6$ is an alkylene group which preferably has a carbon number of 1 to 5 and which may optionally have a fluorine atom; and n3 is 0 or 1, any of the three $X^{d}$'s has a fluorine atom.

Specific examples of the fluorinated alkoxy group (c) include fluorinated alkoxy groups in which an oxygen atom is bonded to an end of the alkyl group for $R^1$ in the above formula (a-1).

The fluorinated alkyl group (a), the fluorinated alkyl group (b) having an ether bond, and the fluorinated alkoxy group (c) in the fluorinated saturated cyclic carbonate (A) each preferably have a fluorine content of 10 mass % or more. If the fluorine content is too low, an effect of reducing the viscosity at low temperatures and an effect of increasing the flash point may not be achieved. Thus, the fluorine content is more preferably 20 mass % or more, still more preferably 30 mass % or more. The upper limit thereof is usually 85 mass %.

The fluorine content of each of the fluorinated alkyl group (a), the fluorinated alkyl group (b) having an ether bond, and the fluorinated alkoxy group (c) is a value calculated by the following formula: {(number of fluorine atoms×19)/(formula weight of the formula)}×100(%) based on the corresponding structural formula.

Further, the fluorine content in the whole fluorinated saturated cyclic carbonate (A) is preferably 5 mass % or more, more preferably 10 mass % or more. The upper limit thereof is usually 76 mass %. In order to achieve a good permittivity and oxidation resistance, the fluorine content in the whole fluorinated saturated cyclic carbonate (A) is preferably 10 to 70 mass % or more, more preferably to 60 mass % or more.

The fluorine content in the whole fluorinated saturated cyclic carbonate (A) is a value calculated by the following formula: {(number of fluorine atoms×19)/(molecular weight of fluorinated saturated cyclic carbonate (A))}×100(%) based on the structural formula of the fluorinated saturated cyclic carbonate (A).

Specific examples of the fluorinated saturated cyclic carbonate (A) include the following.

Those represented by the following formulas:

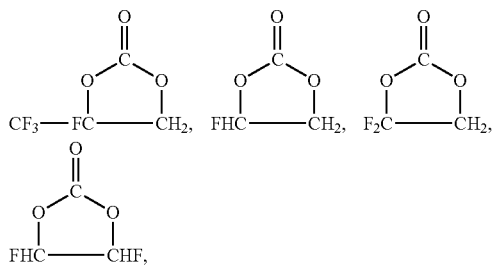

may be mentioned as specific examples of the fluorinated saturated cyclic carbonate (A) represented by the formula (A) in which at least one of $X^1$ to $X^4$ is —F. These compounds have a high withstand voltage and give a good solubility of the electrolyte salt.

Alternatively, those represented by the following formulas:

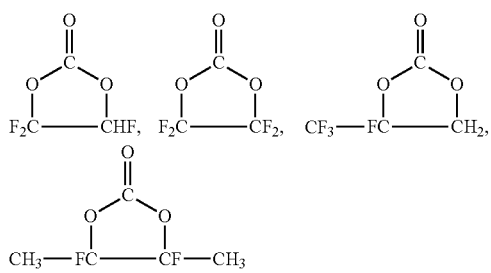

may also be used.

Those represented by the following formulas:

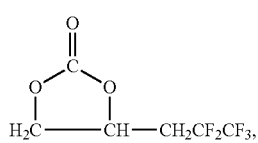

-continued $H_2C\text{—}CH\text{—}CH_2CF(CF_3)_2$ (cyclic carbonate), $H_2C\text{—}CH\text{—}CF_3$ (cyclic carbonate), $H_2C\text{—}CH\text{—}CH_2F$ (cyclic carbonate), $H_2C\text{—}CH\text{—}CF_2H$ (cyclic carbonate), $CF_3CF_2\text{—}CH\text{—}CH_2$ (cyclic carbonate), $HCF_2CF_2\text{—}CH\text{—}CH_2$ (cyclic carbonate), $H_2CFCF_2\text{—}CH\text{—}CH_2$ (cyclic carbonate), $CH_3CF_2\text{—}CH\text{—}CH_2$ (cyclic carbonate), $CF_3CF_2CF_2\text{—}CH\text{—}CH_2$ (cyclic carbonate), $CF_3CF_2CF_2\text{—}CH\text{—}CH_2$ (cyclic carbonate), $HCF_2CF_2CF_2\text{—}CH\text{—}CH_2$ (cyclic carbonate), $HCF_2CF_2CF_2CF_2\text{—}CH\text{—}CH_2$ (cyclic carbonate), $H_2CFCF_2CF_2\text{—}CH\text{—}CH_2$ (cyclic carbonate), $CH_3CF_2CF_2\text{—}CH\text{—}CH_2$ (cyclic carbonate), may be mentioned as specific examples of the fluorinated saturated cyclic carbonate (A) represented by the formula (A) in which at least one of $X^1$ to $X^4$ is a fluorinated alkyl group (a) and the others thereof are —H.

Those represented by the following formulas:

$CF_3O\text{—}CH\text{—}CH_2$ (cyclic carbonate), $CF_3\text{—}OCH_2\text{—}CH\text{—}CH_2$ (cyclic carbonate), $HCF_2\text{—}OCH_2\text{—}CH\text{—}CH_2$ (cyclic carbonate), $CF_3CH_2\text{—}OCH_2\text{—}CH\text{—}CH_2$ (cyclic carbonate), $CF_3CF_2CH_2\text{—}OCH_2\text{—}CH\text{—}CH_2$ (cyclic carbonate), $CF_3CF_2CF_2\text{—}OCH_2\text{—}CH\text{—}CH_2$ (cyclic carbonate), $CF_3(CF_3)CH\text{—}OCH_2\text{—}CH\text{—}CH_2$ (cyclic carbonate), $(CF_3)_3C\text{—}OCH_2\text{—}CH\text{—}CH_2$ (cyclic carbonate), $CH_3(CF_3)_2CCH_2\text{—}OCH_2\text{—}CH\text{—}CH_2$ (cyclic carbonate), $FCH_2CF_2CF_2\text{—}OCH_2\text{—}CH\text{—}CH_2$ (cyclic carbonate), $FCH_2CF_2CH_2\text{—}OCH_2\text{—}CH\text{—}CH_2$ (cyclic carbonate), $CF_3CH_2CH_2\text{—}OCH_2\text{—}CH\text{—}CH_2$ (cyclic carbonate), $CF_3CF_2CH_2CH_2\text{—}OCH_2\text{—}CH\text{—}CH_2$ (cyclic carbonate), $CH_3CF_2CH_2CH_2\text{—}OCH_2\text{—}CH\text{—}CH_2$ (cyclic carbonate), $HCF_2CF_2CH_2\text{—}OCH_2\text{—}CH\text{—}CH_2$ (cyclic carbonate), $CF_3CF_2CF_2CH_2CH_2\text{—}OCH_2\text{—}CH\text{—}CH_2$ (cyclic carbonate), $HCF_2CF_2CF_2CF_2CH_2\text{—}OCH_2\text{—}CH\text{—}CH_2$ (cyclic carbonate),

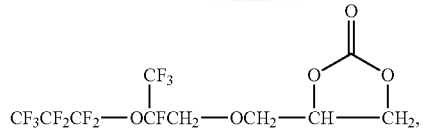
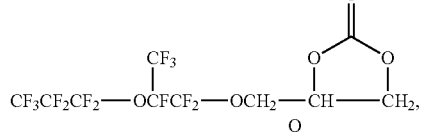
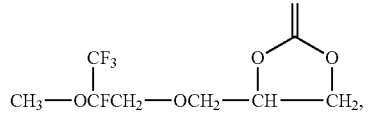
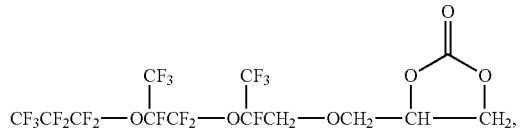
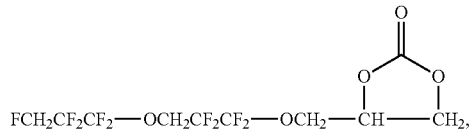
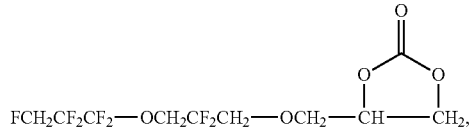
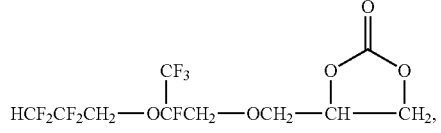
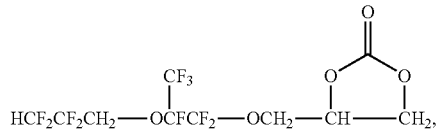
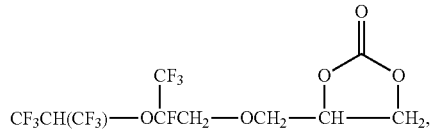
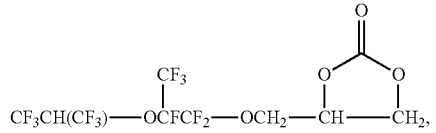
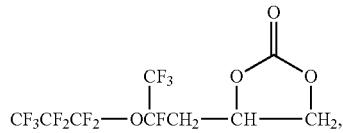
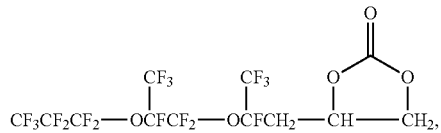
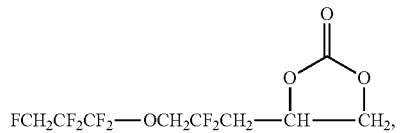
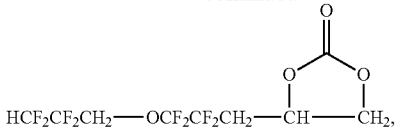
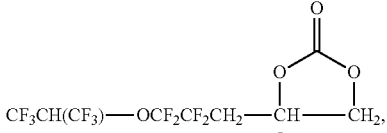
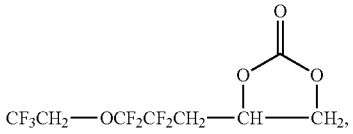
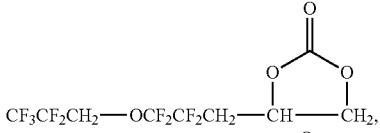
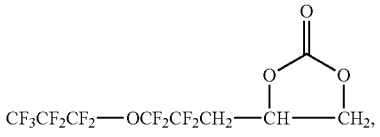
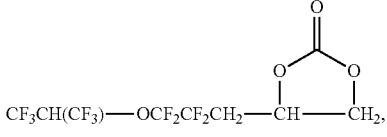
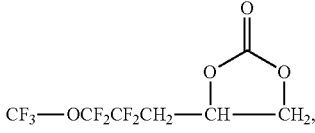
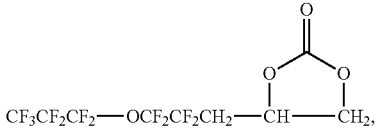
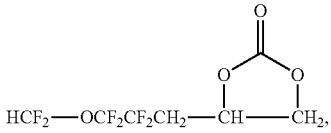
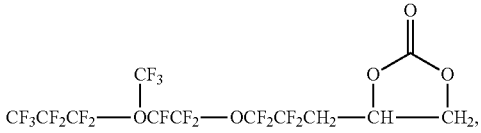
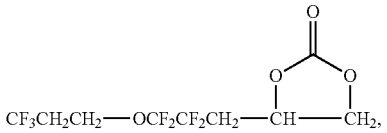
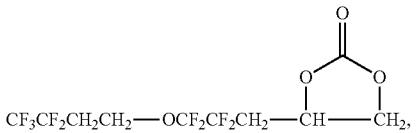
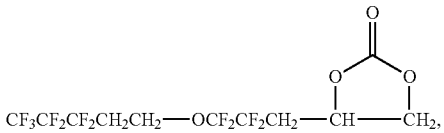

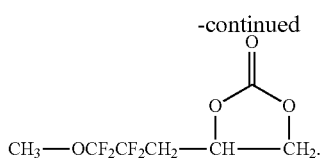

may be mentioned as specific examples of the fluorinated saturated cyclic carbonate (A) represented by the formula (A) in which at least one of $X^1$ to $X^4$ is a fluorinated alkyl group (b) having an ether bond or a fluorinated alkoxy group (c) and the others thereof are —H.

The fluorinated saturated cyclic carbonate (A) is not limited to the above specific examples. One of the above fluorinated saturated cyclic carbonates (A) may be used alone, or two or more thereof may be used in any combination at any ratio.

The fluorinated saturated cyclic carbonate (A) is preferably fluoroethylene carbonate or difluoroethylene carbonate.

The solvent in the present invention also contains a fluorinated acyclic carbonate.

The fluorinated acyclic carbonate is an acyclic carbonate having a fluorine atom, and has a fluorine content of 31.0 to 70.0 mass %. An electrolyte solution containing a fluorinated acyclic carbonate having a fluorine content within the above range is capable of improving the high-temperature storage characteristics and cycle characteristics of electrochemical devices. The lower limit of the fluorine content is preferably 33.0 mass %. The upper limit of the fluorine content is preferably 60.0 mass %, more preferably 55.0 mass %.

The fluorine content is a value calculated by the following formula: {(number of fluorine atoms×19)/(molecular weight of fluorinated acyclic carbonate)}×100(%) based on the structural formula of the fluorinated acyclic carbonate.

The fluorinated acyclic carbonate is preferably a fluorocarbonate represented by the formula (B):

(wherein $Rf^1$ and $Rf^2$ may be the same as or different from each other, and are each a C1-C19 alkyl group which may optionally have a fluorine atom and may optionally have an ether bond, at least one of $Rf^1$ and $Rf^2$ being a C1-C19 fluoroalkyl group which may optionally have an ether bond) because such a fluorocarbonate has high incombustibility and good rate characteristics and oxidation resistance. The carbon numbers of $Rf^1$ and $Rf^2$ are each preferably 1 to 5.

Examples of groups for $Rf^1$ and $Rf^2$ include fluoroalkyl groups such as $CF_3$—, $CF_3CH_2$—, $HCF_2CF_2CH_2$—, $CF_3CF_2CH_2$—, $(CF_3)_2CH$—, $H(CF_2CF_2)_2CH_2$—, and $CF_3$—$CF_2$—, fluoroalkyl groups having an ether bond such as $C_3F_7OCF(CF_3)$ $CH_2$—, $C_3F_7OCF(CF_3)$ $CF_2OCF(CF_3)$ $CH_2$—, $C_2F_5OCF(CF_3)$ $CH_2$—, $CF_3OCF(CF_3)CH_2$—, and $C_2F_5OC(CF_3)_2CH_2$—, and fluorine-free alkyl groups such as $CH_3$—, $C_2H_5$—, $C_3H_7$—, and $C_4H_5$—. The groups for $Rf^1$ and $Rf^2$ may be selected among these groups such that the fluorinated acyclic carbonate has a fluorine content within the above range.

Specific examples of the fluorinated acyclic carbonate include $(CF_3CH_2O)_2CO$, $(HCF_2CF_2CH_2O)_2CO$, $(CF_3CF_2CH_2O)_2CO$, $((CF_3)_2CHO)_2CO$, $(H(CF_2CF_2)\ 2CH_2O)_2CO$, $(C_3F_7OCF(CF_3)CF_2OCF(CF_3)CH_2O)_2CO$, $(C_3F_7OCF(CF_3)CH_2O)_2CO$, $CH_3OCOOCH_2CF_2CF_3$, $CH_3OCOOCH_2CF_2CF_2H$, $C_2H_5OCOOCH_2CF_2CF_2H$, $CH_3OCOOCH_2CF_3$, $C_2H_5OCOOCH_2CF_3$, $CF_3CF_2CH_2OCOOCH_2CF_2$ $CF_2H$, $C_3F_7OCF(CF_3)$ $CH_2OCOOC_3H_7$, $HCF_2CF_2CH_2$ $OCOOC_3H_7$, $(CF_3)_2CHOCOOCH_3$, and $CH_3OCOOCF_3$.

The fluorinated acyclic carbonate is preferably at least one selected from the group consisting of $(CF_3CH_2O)_2CO$, $(HCF_2CF_2CH_2O)_2CO$, $(CF_3CF_2CH_2O)_2CO$, $((CF_3)_2CHO)_2CO$, $(H(CF_2CF_2)_2CH_2O)_2CO$, $(C_3F_7OCF(CF_3)CF_2OCF(CF_3)$ $CH_2O)_2CO$, $(C_3F_7OCF(CF_3)$ $CH_2O)_2CO$, $CH_3OCOOCH_2CF_2CF_3$, $CH_3OCOOCH_2CF_2CF_2H$, $C_2H_5$ $OCOOCH_2CF_2CF_2H$, $CH_3OCOOCH_2CF_3$, $C_2H_5OCOO$ $CH_2CF_3$, $CF_3CF_2CH_2OCOOCH_2CF_2CF_2H$, $C_3F_7OCF$ $(CF_3)$ $CH_2OCOOC_3H_7$, $HCF_2CF_2CH_2OCOOC_3H_7$, $(CF_3)_2$ $CHOCOOCH_3$, and $CH_3OCOOCF_3$.

In the electrolyte solution of the present invention, preferably, the proportion of the fluorinated saturated cyclic carbonate is 3 to 97 vol % and the proportion of the fluorinated acyclic carbonate is 3 to 97 vol % relative to the solvent. This enables suppression of gas generation when an electrochemical device is stored at high temperature. The proportions of the fluorinated saturated cyclic carbonate and the fluorinated acyclic carbonate in the solvent are, respectively, more preferably 3 to 60 vol % and 5 to 97 vol %, still more preferably 20 to 60 vol % and to 80 vol %, particularly preferably 20 to 40 vol % and 60 to 80 vol %.

The sum of the proportions of the fluorinated saturated cyclic carbonate and the fluorinated acyclic carbonate relative to the solvent is preferably 6 to 100 vol %. The sum of the proportions of the fluorinated saturated cyclic carbonate and the fluorinated acyclic carbonate within the above range makes the electrolyte solution more suitable for high-voltage electrochemical devices. The lower limit of the sum of the proportions of the fluorinated saturated cyclic carbonate and the fluorinated acyclic carbonate is more preferably 60 vol %, still more preferably 80 vol %.

The solvent in the present invention may further contain a non-fluorinated saturated cyclic carbonate and/or a non-fluorinated acyclic carbonate.

Examples of the non-fluorinated saturated cyclic carbonate include non-fluorinated saturated cyclic carbonates having a C2-C4 alkylene group.

Specific examples of the non-fluorinated saturated cyclic carbonates having a C2-C4 alkylene group include ethylene carbonate, propylene carbonate, and butylene carbonate. In order to improve the degree of dissociation of lithium ions and the load characteristics, ethylene carbonate and propylene carbonate are particularly preferred.

The non-fluorinated saturated cyclic carbonates may be used alone or in any combination of two or more at any ratio.

Examples of the non-fluorinated acyclic carbonate include dimethyl carbonate, diethyl carbonate, di-n-propyl carbonate, diisopropyl carbonate, n-propyl isopropyl carbonate, ethyl methyl carbonate, methyl-n-propyl carbonate, n-butyl methyl carbonate, isobutyl methyl carbonate, t-butyl methyl carbonate, ethyl-n-propyl carbonate, n-butyl ethyl carbonate, isobutyl ethyl carbonate, and t-butyl ethyl carbonate.

Preferred are dimethyl carbonate, diethyl carbonate, di-n-propyl carbonate, diisopropyl carbonate, n-propyl isopropyl carbonate, ethyl methyl carbonate, and methyl-n-propyl carbonate, and particularly preferred are dimethyl carbonate, diethyl carbonate, and ethyl methyl carbonate.

These non-fluorinated acyclic carbonates may be used alone or in any combination of two or more at any ratio.

If the non-fluorinated saturated cyclic carbonate and/or the non-fluorinated acyclic carbonate are/is used, the sum of the proportions of the non-fluorinated saturated cyclic carbonate and the non-fluorinated acyclic carbonate is preferably 5 to 94 vol % relative to the solvent. The lower limit of the sum of the proportions of the non-fluorinated saturated cyclic carbonate and the non-fluorinated acyclic carbonate may be 30 vol %, or may be 20 vol %.

The solvent is preferably a non-aqueous solvent and the electrolyte solution of the present invention is preferably a non-aqueous electrolyte solution.

The electrolyte solution of the present invention contains at least one sulfur-containing compound selected from the group consisting of compounds having a —$SO_2$— bond, compounds having a —$SO_3$— bond, and compounds having a —$SO_4$— bond. This enables formation of a stable film on a negative electrode of an electrochemical device and an effect of protecting a positive electrode, suppressing generation of gas during storage. As a result, the electrochemical device can have improved high-temperature storage characteristics and cycle characteristics.

In the sulfur-containing compound, —$SO_2$— is —S(=O)$_2$—, —$SO_3$— is —S(=O)$_2$—O— or —O—S(=O)—O—, and —$SO_4$— is —O—S(=O)$_2$—O—.

In the present description, the compounds having a —$SO_2$— bond include none of the compounds having a —$SO_3$— bond and none of the compounds having a —$SO_4$— bond. Also, the compounds having a —$SO_3$— bond include none of the compounds having a —$SO_4$— bond.

Examples of the compounds having a —$SO_2$— bond include acyclic sulfones, cyclic sulfones, and sulfone amides. Specific examples thereof include diphenyl sulfone, sulfolane, sulfolene, N,N-dimethyl methanesulfonamide, and N,N-diethyl methanesulfonamide.

Examples of the compounds having a —S(=O)$_2$—O— bond include acyclic sulfonic esters and sultones.

Examples of the acyclic sulfonic esters include methyl fluorosulfonate, ethyl fluorosulfonate, methyl methanesulfonate, ethyl methanesulfonate, busulfan, methyl vinylsulfonate, ethyl vinylsulfonate, allyl vinylsulfonate, propargyl vinylsulfonate, methyl allylsulfonate, ethyl allylsulfonate, allyl allylsulfonate, propargyl allylsulfonate, and 1,2-bis(vinylsulfonyloxy)ethane.

Examples of the sultones include saturated sultones and unsaturated sultones. For good effects of forming a film on a negative electrode and of protecting a positive electrode, unsaturated sultones are preferred.

The unsaturated sultones are preferably compounds represented by the following formula (1):

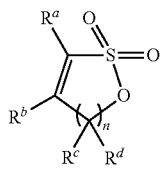

(1)

wherein $R^a$ to $R^d$ may be the same as or different from each other, and are each a hydrogen atom, a fluorine atom, or a C1-C12 hydrocarbon group which may optionally have a fluorine atom; and n is an integer of 0 to 3.

The effects can be achieved when n is any of 0 to 3, and n is preferably 1 or 2, more preferably n is 1.

Specific examples of the C1-C12 hydrocarbon group which may optionally have a fluorine atom include a methyl group, an ethyl group, a vinyl group, an ethynyl group, a propyl group, an isopropyl group, a 1-propenyl group, a 2-propenyl group, a 1-propynyl group, a 2-propynyl group, a butyl group, a sec-butyl group, a t-butyl group, a 1-butenyl group, a 2-butenyl group, a 3-butenyl group, a 2-methyl-2-propenyl group, a 1-methylenepropyl group, a 1-methyl-2-propenyl group, a 1,2-dimethyl vinyl group, a 1-butynyl group, a 2-butynyl group, a 3-butynyl group, a pentyl group, a 1-methylbutyl group, a 2-methylbutyl group, a 3-methylbutyl group, a 1-methyl-2-methylpropyl group, a 2,2-dimethylpropyl group, a phenyl group, a methyl phenyl group, an ethyl phenyl group, a vinyl phenyl group, an ethynyl phenyl group, a hexyl group, a cyclohexyl group, a heptyl group, an octyl group, a nonyl group, a decyl group, an undecyl group, a dodecyl group, a difluoromethyl group, a monofluoromethyl group, a trifluoromethyl group, a trifluoroethyl group, a difluoroethyl group, a pentafluoroethyl group, a pentafluoropropyl group, a tetrafluoropropyl group, a perfluorobutyl group, a perfluoropentyl group, a perfluorohexyl group, a perfluorocyclohexyl group, a perfluoroheptyl group, a perfluorooctyl group, a perfluorononyl group, a perfluorodecyl group, a perfluoroundecyl group, a perfluorododecyl group, a fluorophenyl group, a difluorophenyl group, a trifluorophenyl group, a perfluorophenyl group, a trifluoromethylphenyl group, a naphthyl group, and a biphenyl group.

For good solubility in the electrolyte solution, the carbon numbers of $R^a$ to $R^d$ are each preferably 4 or smaller, more preferably 2 or smaller. Most preferably, $R^a$ to $R^d$ are hydrogen atoms.

Specific examples of the unsaturated sultones represented by the above formula (1) include the following compounds.

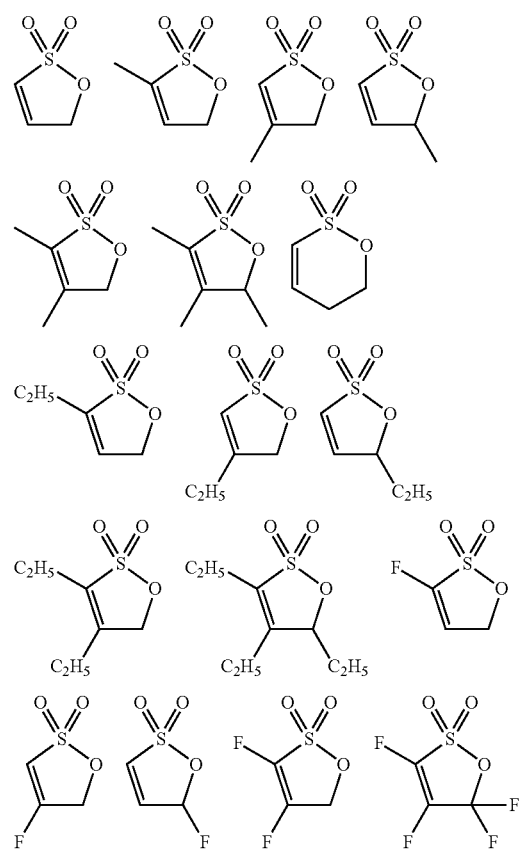

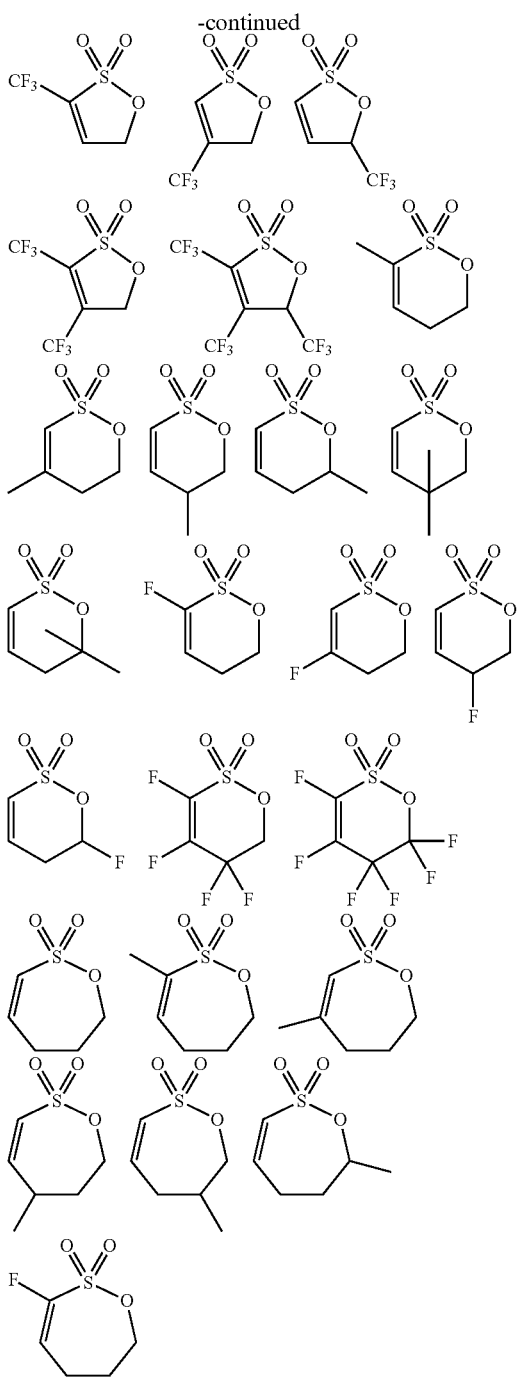

Preferred among these is 1,3-propenesultone represented by the following formula (2).

(2)

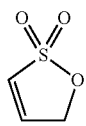

The above 1,3-propenesultone may be synthesized by any method, for example, disclosed in the following documents: Angew. Chem./70. Jahrg. 1958/Nr. 16, Ger. Pat. 1146870 (1963) (CA 59,11259(1963)), Can. J. Chem., 48, 3704 (1970), Synlett, 1411 (1988), Chem. Commun., 611 (1997), Tetrahedron 55, 2245 (1999).

In addition to the above compounds, 3-butene-1,4-sultone may also be used as an unsaturated sultone.

Further, a saturated sultone may be used. Examples of the saturated sultone include 1,3-propanesultone, 1,4-butanesultone, 1-fluoro-1,3-propanesultone, 2-fluoro-1,3-propanesultone, and 3-fluoro-1,3-propanesultone.

Examples of the compounds having a —O—S(=O)—O— bond include ethylene sulfite.

Examples of the compounds having a —SO$_4$— bond include 1,3,2-dioxathiolane 2,2-dioxide.

The sulfur-containing compound is preferably any of sultones, sulfolanes, ethylene sulfite, and 1,3,2-dioxathiolane 2,2-dioxide, more preferably any of sultones and 1,3,2-dioxathiolane 2,2-dioxide, still more preferably any of sultones, much more preferably any of unsaturated sultones, particularly preferably any of unsaturated sultones represented by the above formula (1).

The sulfur-containing compounds may be used alone or in combination of two or more.

The amount of the sulfur-containing compound is preferably 0.1 to 10 mass % relative to the electrolyte solution. This enables more significant exhibition of the effects of forming a film on a negative electrode and of protecting a positive electrode. The lower limit of the amount of the sulfur-containing compound is more preferably 0.5 mass %, still more preferably 1 mass %. The upper limit thereof is more preferably 5 mass %, still more preferably 3 mass %.

The electrolyte solution of the present invention contains an electrolyte salt.

The electrolyte salt may be any salt which can be used for electrolyte solutions, such as lithium salts, ammonium salts, and metal salts, as well as liquid salts (ionic liquid), inorganic polymeric salts, and organic polymeric salts.

The electrolyte salt of the electrolyte solution for lithium ion secondary batteries is preferably a lithium salt.

The lithium salt may be any lithium salt, and specific examples thereof include the following: inorganic lithium salts such as LiPF$_6$, LiBF$_4$, LiClO$_4$, LiAlF$_4$, LiSbF$_6$, LiTaF$_6$, and LiWF$_7$;

lithium tungstates such as LiWOF$_5$;

lithium carboxylates such as HCO$_2$Li, CH$_3$CO$_2$Li, CH$_2$FCO$_2$Li, CHF$_2$CO$_2$Li, CF$_3$CO$_2$Li, CF$_3$CH$_2$CO$_2$Li, CF$_3$CF$_2$CO$_2$Li, CF$_3$CF$_2$CF$_2$CO$_2$Li, and CF$_3$CF$_2$CF$_2$CO$_2$Li;

lithium sulfonates such as FSO$_3$Li, CH$_3$SO$_3$Li, CH$_2$FSO$_3$Li, CHF$_2$SO$_3$Li, CF$_3$SO$_3$Li, CF$_3$CF$_2$SO$_3$Li, CF$_3$CF$_2$CF$_2$SO$_3$Li, and CF$_3$CF$_2$CF$_2$CF$_2$SO$_3$Li;

lithium imide salts such as LiN(FCO)$_2$, LiN(FCO)(FSO$_2$), LiN(FSO$_2$)$_2$, LiN(FSO$_2$)(CF$_3$SO$_2$), LiN(CF$_3$SO$_2$)$_2$, LiN(C$_2$F$_5$SO$_2$)$_2$, lithium cyclic 1,2-perfluoroethanedisulfonylimide, lithium cyclic 1,3-perfluoropropanedisulfonylimide, and LiN(CF$_3$SO$_2$)(C$_4$F$_9$SO$_2$);

lithium methide salts such as LiC(FSO$_2$)$_3$, LiC(CF$_3$SO$_2$)$_3$, and LiC(C$_2$F$_5$SO$_2$)$_3$;

lithium oxalatoborate salts such as lithium difluorooxalatoborate and lithium bis(oxalato)borate; lithium oxalatophosphate salts such as lithium tetrafluorooxalatophosphate, lithium difluorobis(oxalato)phosphate, and lithium tris(oxalato)phosphate; and fluoroorganic lithium salts such as salts represented by the formula: LiPF$_a$(C$_n$F$_{2n+1}$)$_{6-a}$ (wherein a is an integer of 0 to 5; n is an integer of 1 to 6) (e.g., LiPF$_4$(CF$_3$)$_2$, LiPF$_4$(C$_2$F$_5$)$_2$), LiPF$_4$(CF$_3$SO$_2$)$_2$, LiPF$_4$(C$_2$F$_5$SO$_2$)$_2$, LiBF$_3$CF$_3$, $LiBF_3C_2F_5$, $LiBF_3C_3F_7$, $LiBF_2(CF_3)_2$, $LiBF_2(C_2F_5)_2$, $LiBF_2 (CF_3SO_2)_2$, and $LiBF_2 (C_2F_5SO_2)_2$.

For an effect of improving the characteristics such as output characteristics, high-rate charge and discharge characteristics, high-temperature storage characteristics, and cycle characteristics, particularly preferred are $LiPF_6$, $LiBF_4$, $LiSbF_6$, $LiTaF_6$, $FSO_3Li$, $CF_3SO_3Li$, $LiN(FSO_2)_2$, $LiN(FSO_2) (CF_3SO_2)$, $LiN(CF_3SO_2)_2$, $LiN(C_2F_5SO_2)_2$, lithium cyclic 1,2-perfluoroethanedisulfonylimide, lithium cyclic 1,3-perfluoropropanedisulfonylimide, $LiC(FSO_2)_3$, $LiC(CF_3SO_2)_3$, $LiC(C_2F_5SO_2)_3$, lithium bis(oxalato)borate, lithium difluorooxalatoborate, lithium tetrafluorooxalatophosphate, lithium difluorobis(oxalato)phosphate, $LiBF_3CF_3$, $LiBF_3C_2F_5$, $LiPF_3(CF_3)_3$, and $LiPF_3(C_2F_5)_3$.

These lithium salts may be used alone or in combination of two or more. In the case of combination use of two or more lithium salts, preferred is a combination of $LiPF_6$ and $LiBF_4$ or a combination of $LiPF_6$ and $FSO_3Li$. Such combinations have an effect of improving the load characteristics and the cycle characteristics.

In such a case, $LiBF_4$ or $FSO_3Li$ may be used in any amount relative to 100 mass % of the whole electrolyte solution as long as the effects of the present invention are not significantly impaired. The amount thereof relative to the electrolyte solution of the present invention is usually 0.01 mass % or more, preferably 0.1 mass % or more, while usually 30 mass % or less, preferably mass % or less.

Another example is a combination of an inorganic lithium salt and an organic lithium salt, and such a combination use has an effect of suppressing the deterioration during high-temperature storage. Preferred examples of the organic lithium salt include $CF_3SO_3Li$, $LiN(FSO_2)_2$, $LiN(FSO_2) (CF_3SO_2)$, $LiN(CF_3SO_2)_2$, $LiN(C_2F_5SO_2)_2$, lithium cyclic 1,2-perfluoroethanedisulfonylimide, lithium cyclic 1,3-perfluoropropanedisulfonylimide, $LiC(FSO_2)_3$, $LiC(CF_3SO_2)_3$, $LiC(C_2F_5SO_2)_3$, lithium bisoxalatoborate, lithium difluorooxalatoborate, lithium tetrafluorooxalatophosphate, lithium difluorobisoxalatophosphate, $LiBF_3CF_3$, $LiBF_3C_2F_5$, $LiPF_3 (CF_3)_3$, and $LiPF_3(C_2F_5)_3$. In such a case, the proportion of the organic lithium salt relative to 100 mass % of the whole electrolyte solution is preferably 0.1 mass % or more, particularly preferably 0.5 mass % or more, while also preferably 30 mass % or less, particularly preferably 20 mass % or less.

These lithium salts may be used at any concentration in the electrolyte solution as long as they do not impair the effects of the present invention. In order to make the electric conductivity of the electrolyte solution within a favorable range and to secure good battery performance, the total molar concentration of lithium in the electrolyte solution is preferably 0.3 mol/L or more, more preferably 0.4 mol/L or more, still more preferably 0.5 mol/L or more, while also preferably 3 mol/L or less, more preferably 2.5 mol/L or less, still more preferably 2.0 mol/L or less.

Too low a total molar concentration of lithium may lead to an insufficient electric conductivity of the electrolyte solution. Too high a concentration thereof may lead to a decrease in electric conductivity due to an increase in viscosity, likely resulting in poor battery performance.

The electrolyte salt of the electrolyte solution for electric double-layer capacitors is preferably an ammonium salt.

Examples of the ammonium salt include the following salts (IIa) to (IIe).

(IIa) Tetraalkyl Quaternary Ammonium Salts

Preferred examples thereof include tetraalkyl quaternary ammonium salts represented by the following formula (IIa):

(wherein $R^{1a}$, $R^{2a}$, $R^{3a}$, and $R^{4a}$ may be the same as or different from each other, and are each a C1-C6 alkyl group which may optionally have an ether bond; and $X^-$ is an anion). In order to improve the oxidation resistance, part or all of the hydrogen atoms in the ammonium salt is/are also preferably replaced by a fluorine atom and/or a C1-C4 fluoroalkyl group.

Specific examples thereof include tetraalkyl quaternary ammonium salts represented by the following formula (IIa-1):

$$(R^{1a})_x(R^{2a})_y N^\oplus X^\ominus \qquad (IIa-1)$$

(wherein $R^{1a}$, $R^{2a}$, and $X^-$ are defined in the same manner as mentioned above; x and y may be the same as or different from each other, and are each an integer of 0 to 4, where x+y=4), and alkyl ether group-containing trialkyl ammonium salts represented by the formula (IIa-2):

(wherein $R^{5a}$ is a C1-C6 alkyl group; $R^{6a}$ is a C1-C6 divalent hydrocarbon group; $R^{7a}$ is a C1-C4 alkyl group; z is 1 or 2; and $X^-$ is an anion). Introduction of an alkyl ether group may lead to a decrease in viscosity.

The anion $X^-$ may be either an inorganic anion or an organic anion. Examples of the inorganic anion include $AlCl_4^-$, $BF_4^-$, $PF_6^-$, $AsF_6^-$, $TaF_6^-$, $I^-$, and $SbF_6^-$. Examples of the organic anion include $CF_3COO-$, $CF_3SO_3-$, $(CF_3SO_2)_2N-$, and $(C_2F_5SO_2)_2N^-$.

In order to achieve good oxidation resistance and ionic dissociation, $BF_4^-$, $PF_6^-$, $AsF_6^-$, and $SbF_6^-$ are preferred.

Preferred specific examples of the tetraalkyl quaternary ammonium salt include $Et_4NBF_4$, $Et_4NClO_4$, $Et_4NPF_6$, $Et_4NAsF_6$, $Et_4NSbF_6$, $Et_4NCF_3SO_3$, $Et_4N(CF_3SO_2)_2N$, $Et_4NC_4F_9SO_3$, $Et_3MeNBF_4$, $Et_3MeNClO_4$, $Et_3MeNPF_6$, $Et_3MeNAsF_6$, $Et_3MeNSbF_6$, $Et_3MeNCF_3SO_3$, $Et_3MeN(CF_3SO_2)_2N$, and $Et_3MeNC_4F_9SO_3$. Particularly preferred examples thereof include $Et_4NBF_4$, $Et_4NPF_6$, $Et_4NSbF_6$, $Et_4NAsF_6$, $Et_3MeNBF_4$, and N,N-diethyl-N-methyl-N-(2-methoxyethyl)ammonium salts.

(IIb) Spirocyclic Bipyrrolidinium Salts

Preferred examples thereof include spirocyclic bipyrrolidinium salts represented by the following formula (IIb-1):

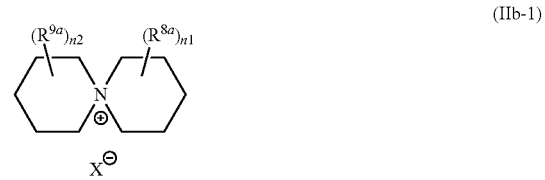

(wherein $R^{8a}$ and $R^{9a}$ may be the same as or different from each other, and are each a C1-C4 alkyl group; $X^-$ is an anion;

n1 is an integer of 0 to 5; and n2 is an integer of 0 to 5); spirocyclic bipyrrolidinium salts represented by the following formula (IIb-2):

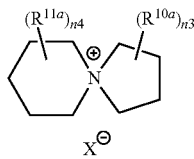

(IIb-2)

(wherein $R^{10a}$ and $R^{11a}$ a may be the same as or different from each other, and are each a C1-C4 alkyl group; $X^-$ is an anion; n3 is an integer of 0 to 5; and n4 is an integer of 0 to 5); and spirocyclic bipyrrolidinium salts represented by the following formula (IIb-3):

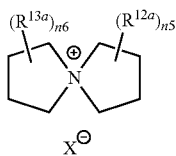

(IIb-2)

(wherein $R^{12a}$ and $R^{13a}$ may be the same as or different from each other, and are each a C1-C4 alkyl group; $X^-$ is an anion; n5 is an integer of 0 to 5; and n6 is an integer of 0 to 5). In order to improve the oxidation resistance, part or all of the hydrogen atoms in the spirocyclic bipyrrolidinium salt is/are also preferably replaced by a fluorine atom and/or a C1-C4 fluoroalkyl group.

Preferred specific examples of the anion $X^-$ are the same as those mentioned for the salts (IIa). In order to achieve good dissociation and a low internal resistance under high voltage, $BF_4^-$, $PF_6^-$, $(CF_3SO_2)_2N^-$, or $(C_2F_5SO_2)_2N^-$ is particularly preferred.

For example, those represented by the following formulas:

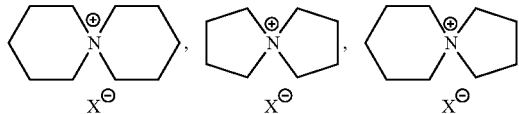

may be mentioned as preferred specific examples of the spirocyclic bipyrrolidinium salt.

These spirocyclic bipyrrolidinium salts are excellent in the solubility in a solvent, the oxidation resistance, and the ion conductivity.

(IIc) Imidazolium Salts

Preferred examples thereof include imidazolium salts represented by the following formula (IIc):

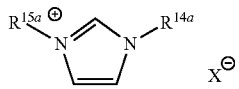

(IIc)

(wherein $R^{14a}$ and $R^{15a}$ may be the same as or different from each other, and are each a C1-C6 alkyl group; and $X^-$ is an anion). In order to improve the oxidation resistance, part or all of the hydrogen atoms in the imidazolium salt is/are also preferably replaced by a fluorine atom and/or a C1-C4 fluoroalkyl group.

Preferred specific examples of the anion $X^-$ are the same as those mentioned for the salts (IIa).

For example, one represented by the following formula:

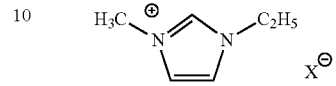

may be mentioned as a preferred specific example.

This imidazolium salt is excellent in that it has a low viscosity and a good solubility.

(IId): N-Alkylpyridinium Salts

Preferred examples thereof include N-alkylpyridinium salts represented by the following formula (IId):

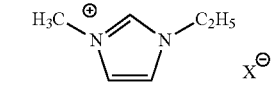

(IId)

(wherein $R^{16a}$ is a C1-C6 alkyl group; and $X^-$ is an anion). In order to improve the oxidation resistance, part or all of the hydrogen atoms in the N-alkylpyridinium salt is/are also preferably replaced by a fluorine atom and/or a C1-C4 fluoroalkyl group.

Preferred specific examples of the anion $X^-$ are the same as those mentioned for the salts (IIa).

For example, those represented by the following formulas:

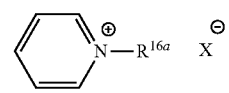

may be mentioned as preferred specific examples.

These N-alkylpyridinium salts are excellent in that they have a low viscosity and a good solubility.

(IIe) N,N-Dialkylpyrrolidinium Salts

Preferred examples thereof include N,N-dialkylpyrrolidinium salts represented by the following formula (IIe):

(IIe)

(wherein $R^{17a}$ and $R^{18a}$ may be the same as or different from each other, and are each a C1-C6 alkyl group; $X^-$ is an anion). In order to improve the oxidation resistance, part or all of the hydrogen atoms in the N,N-dialkylpyrrolidinium salt is/are also preferably replaced by a fluorine atom and/or a C1-C4 fluoroalkyl group.

Preferred specific examples of the anion $X^-$ are the same as those mentioned for the salts (IIa).

For example, those represented by the following formulas:

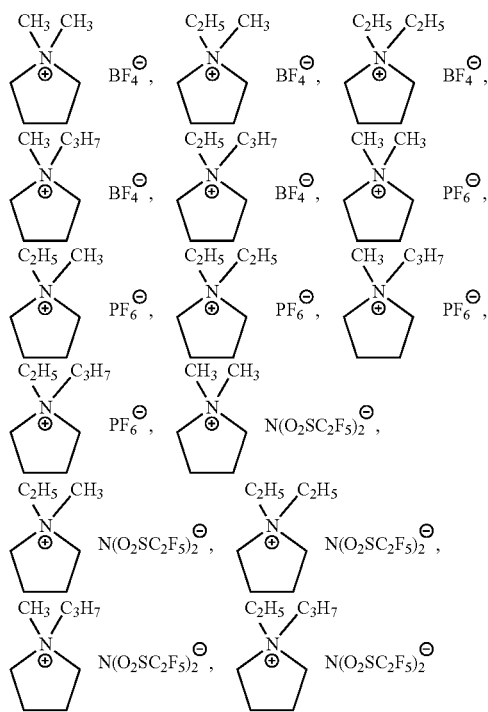

may be mentioned as preferred specific examples.

These N,N-dialkylpyrrolidinium salts are excellent in that they have a low viscosity and a good solubility.

Preferred among these ammonium salts are those represented by the formula (IIa), (IIb), or (IIc) because they have good solubility, oxidation resistance, and ion conductivity. More preferred are those represented by any of the formulas:

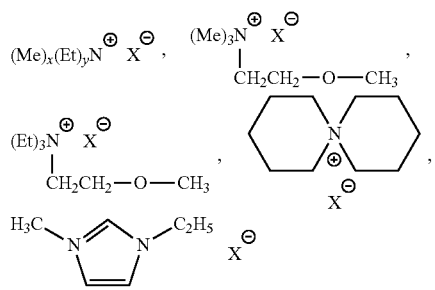

wherein Me is a methyl group; Et is an ethyl group; $X^-$, x, and y are defined in the same manner as in the formula (IIa-1).

The electrolyte salt for electric double-layer capacitors may be a lithium salt. Preferred examples of the lithium salt include $LiPF_6$, $LiBF_4$, $LiAsF_6$, $LiSbF_6$, and $LiN(SO_2C_2H_5)_2$.

In order to further increase the capacity, a magnesium salt may be used. Preferred examples of the magnesium salt include $Mg(ClO_4)_2$ and $Mg(OOC_2H_5)_2$.

If the electrolyte salt is any of the above ammonium salts, the concentration thereof is preferably 1.1 mol/L or higher. If the concentration thereof is lower than 1.1 mol/L, not only the low-temperature characteristics may be poor but also the initial internal resistance may be high. The concentration of the electrolyte salt is more preferably 1.25 mol/L or higher.

For good low-temperature characteristics, the concentration is preferably 1.7 mol/L or lower, more preferably 1.5 mol/L or lower.

If the ammonium salt is triethyl methyl ammonium tetrafluoroborate ($TEMABF_4$), the concentration thereof is preferably 1.1 to 1.4 mol/L in order to achieve excellent low-temperature characteristics.

If the ammonium salt is spirobipyrrolidinium tetrafluoroborate ($SBPBF_4$), the concentration thereof is preferably 1.3 to 1.7 mol/L.

The electrolyte solution of the present invention preferably further comprises polyethylene oxide that has a weight average molecular weight of 2000 to 4000 and has —OH, —OCOOH, or —COOH at an end.

Containing such a compound improves the stability at the interfaces between the electrolyte solution and the respective electrodes, improving the characteristics of an electrochemical device.

Examples of the polyethylene oxide include polyethylene oxide monool, polyethylene oxide carboxylate, polyethylene oxide diol, polyethylene oxide dicarboxylate, polyethylene oxide triol, and polyethylene oxide tricarboxylate. These may be used alone or in combination of two or more.

In order to achieve good characteristics of an electrochemical device, a mixture of polyethylene oxide monool and polyethylene oxide diol and a mixture of polyethylene carboxylate and polyethylene dicarboxylate are preferred.

The polyethylene oxide having too small a weight average molecular weight may be easily oxidatively decomposed. The weight average molecular weight is more preferably 3000 to 4000.

The weight average molecular weight can be determined in terms of polystyrene equivalent by gel permeation chromatography (GPC).

The amount of the polyethylene oxide is preferably $1 \times 10^{-6}$ to $1 \times 10^{-2}$ mol/kg in the electrolyte solution. Too large an amount of the polyethylene oxide may impair the characteristics of an electrochemical device.

The amount of the polyethylene oxide is more preferably $5 \times 10^{-6}$ mol/kg or more.

The electrolyte solution of the present invention may further contain any of unsaturated cyclic carbonates, overcharge inhibitors, and other known auxiliary agents. This enables suppression of degradation in the characteristics of an electrochemical device.

Examples of the unsaturated cyclic carbonate include vinylene carbonates, ethylene carbonates substituted with a substituent having an aromatic ring, a carbon-carbon double bond, or a carbon-carbon triple bond, phenyl carbonates, vinyl carbonates, allyl carbonates, and catechol carbonates.

Examples of the vinylene carbonates include vinylene carbonate, methyl vinylene carbonate, 4,5-dimethyl vinylene carbonate, phenyl vinylene carbonate, 4,5-diphenyl vinylene carbonate, vinyl vinylene carbonate, 4,5-divinyl vinylene carbonate, allyl vinylene carbonate, 4,5-diallyl vinylene carbonate, 4-fluorovinylene carbonate, 4-fluoro-5- methyl vinylene carbonate, 4-fluoro-5-phenyl vinylene carbonate, 4-fluoro-5-vinyl vinylene carbonate, and 4-allyl-5-fluorovinylene carbonate.

Specific examples of the ethylene carbonates substituted with a substituent having an aromatic ring, a carbon-carbon double bond, or a carbon-carbon triple bond include vinyl ethylene carbonate, 4,5-divinyl ethylene carbonate, 4-methyl-5-vinyl ethylene carbonate, 4-allyl-5-vinyl ethylene carbonate, ethynyl ethylene carbonate, 4,5-diethynyl ethylene carbonate, 4-methyl-5-ethynyl ethylene carbonate, 4-vinyl-5-ethynyl ethylene carbonate, 4-allyl-5-ethynyl ethylene carbonate, phenyl ethylene carbonate, 4,5-diphenyl ethylene carbonate, 4-phenyl-5-vinyl ethylene carbonate, 4-allyl-5-phenyl ethylene carbonate, allyl ethylene carbonate, 4,5-diallyl ethylene carbonate, and 4-methyl-5-allyl ethylene carbonate.

The unsaturated cyclic carbonates are particularly preferably vinylene carbonate, methyl vinylene carbonate, 4,5-dimethyl vinylene carbonate, vinyl vinylene carbonate, 4,5-vinyl vinylene carbonate, allyl vinylene carbonate, 4,5-diallyl vinylene carbonate, vinyl ethylene carbonate, 4,5-divinyl ethylene carbonate, 4-methyl-5-vinyl ethylene carbonate, allyl ethylene carbonate, 4,5-diallyl ethylene carbonate, 4-methyl-5-allyl ethylene carbonate, 4-allyl-5-vinyl ethylene carbonate, ethynyl ethylene carbonate, 4,5-diethynyl ethylene carbonate, 4-methyl-5-ethynyl ethylene carbonate, and 4-vinyl-5-ethynyl ethylene carbonate. Vinylene carbonate, vinyl ethylene carbonate, and ethynyl ethylene carbonate are also particularly preferred because they form a more stable interface protective coating.

The unsaturated cyclic carbonate may have any molecular weight that does not significantly deteriorate the effects of the present invention. The molecular weight is preferably 80 or higher and 250 or lower. The unsaturated cyclic carbonate having a molecular weight within this range is likely to assure its solubility in the non-aqueous electrolyte solution and to enable sufficient achievement of the effects of the present invention. The molecular weight of the unsaturated cyclic carbonate is more preferably 85 or higher and 150 or lower.

The unsaturated cyclic carbonate may be produced by any method, and can be produced by any known appropriately selected method.

These unsaturated cyclic carbonates may be used alone or in any combination of two or more at any ratio.

The unsaturated cyclic carbonate may be in any amount that does not impair the effects of the present invention. The amount of the unsaturated cyclic carbonate is preferably 0.001 mass % or more, more preferably 0.01 mass % or more, still more preferably 0.1 mass % or more, in 100 mass % of the solvent in the present invention. The amount thereof is also preferably 5 mass % or less, more preferably 4 mass % or less, still more preferably 3 mass % or less. The unsaturated cyclic carbonate in an amount within the above range may allow an electrochemical device containing the electrolyte solution to easily exert an effect of sufficiently improving the cycle characteristics, and may make it easy to avoid a decrease in high-temperature storage characteristics, an increase in amount of gas generated, and a decrease in discharge capacity retention ratio.

The unsaturated cyclic carbonate may be suitably a fluorinated unsaturated cyclic carbonate in addition to the aforementioned non-fluorinated unsaturated cyclic carbonates.

The fluorinated unsaturated cyclic carbonate is a cyclic carbonate having an unsaturated bond and a fluorine atom. The number of fluorine atoms in the fluorinated unsaturated cyclic carbonate may be any number that is 1 or greater. The number of fluorine atoms is usually 6 or smaller, preferably 4 or smaller, most preferably 1 or 2.

Examples of the fluorinated unsaturated cyclic carbonate include fluorinated vinylene carbonate derivatives and fluorinated ethylene carbonate derivatives substituted with a substituent having an aromatic ring or a carbon-carbon double bond.

Examples of the fluorinated vinylene carbonate derivatives include 4-fluorovinylene carbonate, 4-fluoro-5-methyl vinylene carbonate, 4-fluoro-5-phenyl vinylene carbonate, 4-allyl-5-fluorovinylene carbonate, and 4-fluoro-5-vinyl vinylene carbonate.

Examples of the fluorinated ethylene carbonate derivatives substituted with a substituent having an aromatic ring or a carbon-carbon double bond include 4-fluoro-4-vinyl ethylene carbonate, 4-fluoro-4-allyl ethylene carbonate, 4-fluoro-5-vinyl ethylene carbonate, 4-fluoro-5-allyl ethylene carbonate, 4,4-difluoro-4-vinyl ethylene carbonate, 4,4-difluoro-4-allyl ethylene carbonate, 4,5-difluoro-4-vinyl ethylene carbonate, 4,5-difluoro-4-allyl ethylene carbonate, 4-fluoro-4,5-divinyl ethylene carbonate, 4-fluoro-4,5-diallyl ethylene carbonate, 4,5-difluoro-4,5-divinyl ethylene carbonate, 4,5-difluoro-4,5-diallyl ethylene carbonate, 4-fluoro-4-phenyl ethylene carbonate, 4-fluoro-5-phenyl ethylene carbonate, 4,4-difluoro-5-phenyl ethylene carbonate, and 4,5-difluoro-4-phenyl ethylene carbonate.

More preferred fluorinated unsaturated cyclic carbonates to be used are 4-fluorovinylene carbonate, 4-fluoro-5-methyl vinylene carbonate, 4-fluoro-5-vinyl vinylene carbonate, 4-allyl-5-fluorovinylene carbonate, 4-fluoro-4-vinyl ethylene carbonate, 4-fluoro-4-allyl ethylene carbonate, 4-fluoro-5-vinyl ethylene carbonate, 4-fluoro-5-allyl ethylene carbonate, 4,4-difluoro-4-vinyl ethylene carbonate, 4,4-difluoro-4-allyl ethylene carbonate, 4,5-difluoro-4-vinyl ethylene carbonate, 4,5-difluoro-4-allyl ethylene carbonate, 4-fluoro-4,5-divinyl ethylene carbonate, 4-fluoro-4,5-diallyl ethylene carbonate, 4,5-difluoro-4,5-divinyl ethylene carbonate, and 4,5-difluoro-4,5-diallyl ethylene carbonate because they form a stable interface protective coating.

The fluorinated unsaturated cyclic carbonate may have any molecular weight that does not significantly deteriorate the effects of the present invention. The molecular weight is preferably 50 or higher and 250 or lower. The fluorinated unsaturated cyclic carbonate having a molecular weight within this range is likely to assure the solubility of the fluorinated unsaturated cyclic carbonate in the electrolyte solution and to exert the effects of the present invention.

The fluorinated unsaturated cyclic carbonate may be produced by any method, and can be produced by any known appropriately selected method. The molecular weight thereof is more preferably 100 or more and 200 or less.

The above fluorinated unsaturated cyclic carbonates may be used alone or in any combination of two or more at any ratio. The fluorinated unsaturated cyclic carbonate may be in any amount that does not significantly impair the effects of the present invention. The amount of the fluorinated unsaturated cyclic carbonate is usually preferably 0.01 mass % or more, more preferably 0.1 mass % or more, still more preferably 0.2 mass % or more, while also preferably 5 mass % or less, more preferably 4 mass % or less, still more preferably 3 mass % or less, in 100 mass % of the electrolyte solution. The fluorinated unsaturated cyclic carbonate in an amount within this range is likely to allow an electrochemical device containing the electrolyte solution to exert an effect of sufficiently improving the cycle characteristics, and may make it easy to avoid a decrease in high-temperature storage characteristics, an increase in amount of gas generated, and a decrease in discharge capacity retention ratio.

In order to effectively suppress burst or combustion of batteries in case of, for example, overcharge of electrochemical devices containing the electrolyte solution of the present invention, an overcharge inhibitor may be used.

Examples of the overcharge inhibitor include aromatic compounds such as biphenyl, alkyl biphenyl, terphenyl, partially hydrogenated terphenyl, cyclohexyl benzene, t-butyl benzene, t-amyl benzene, diphenyl ether, and dibenzofuran; partially fluorinated products of the above aromatic compounds such as 2-fluorobiphenyl, o-cyclohexyl fluorobenzene, and p-cyclohexyl fluorobenzene; and fluoroanisole compounds such as 2,4-difluoroanisole, 2,5-difluoroanisole, 2,6-difluoroanisole, and 3,5-difluoroanisole. Preferred are aromatic compounds such as biphenyl, alkyl biphenyl, terphenyl, partially hydrogenated terphenyl, cyclohexyl benzene, t-butyl benzene, t-amyl benzene, diphenyl ether, and dibenzofuran. These compounds may be used alone or in combination of two or more. In the case of combination use of two or more compounds, preferred is a combination of cyclohexyl benzene and t-butyl benzene or t-amyl benzene, or a combination of at least one oxygen-free aromatic compound selected from biphenyl, alkyl biphenyl, terphenyl, partially hydrogenated terphenyl, cyclohexyl benzene, t-butyl benzene, t-amyl benzene, and the like, and at least one oxygen-containing aromatic compound selected from diphenyl ether, dibenzofuran, and the like. Such combinations lead to good balance between the overcharge inhibiting characteristics and the high-temperature storage characteristics.

The electrolyte solution of the present invention may further contain any other known auxiliary agent. Examples of the auxiliary agent include carbonate compounds such as erythritan carbonate, spiro-bis-dimethylene carbonate, and methoxy ethyl-methyl carbonate; carboxylic anhydrides such as succinic anhydride, glutaric anhydride, maleic anhydride, citraconic anhydride, glutaconic anhydride, itaconic anhydride, diglycolic anhydride, cyclohexanedicarboxylic anhydride, cyclopentanetetracarboxylic dianhydride, and phenylsuccinic anhydride; spiro compounds such as 2,4,8,10-tetraoxaspiro[5.5]undecane and 3,9-divinyl-2,4,8,10-tetraoxaspiro[5.5]undecane; nitrogen-containing compounds such as 1-methyl-2-pyrrolidinone, 1-methyl-2-piperidone, 3-methyl-2-oxazolidinone, 1,3-dimethyl-2-imidazolidinone, and N-methylsuccinimide; phosphorous-containing compounds such as trimethyl phosphonate, triethyl phosphonate, triphenyl phosphonate, trimethyl phosphate, triethyl phosphate, triphenyl phosphate, dimethyl methylphosphonate, diethyl ethylphosphonate, dimethyl vinylphosphonate, diethyl vinylphosphonate, ethyl diethylphosphonoacetate, methyl dimethylphosphinate, ethyl diethylphosphinate, trimethylphosphine oxide, and triethylphosphine oxide; hydrocarbon compounds such as heptane, octane, nonane, decane, and cycloheptane; and fluoroaromatic compounds such as fluorobenzene, difluorobenzene, hexafluorobenzene, and benzotrifluoride. These assistants may be used alone or in combination of two or more. Adding any of these assistants can improve the capacity retention characteristics and cycle characteristics after high-temperature storage.

The auxiliary agent may be used in any amount that does not significantly impair the effects of the present invention. The amount of the auxiliary agent is preferably 0.01 mass % or more and 5 mass % or less in 100 mass % of the electrolyte solution. The auxiliary agent in an amount within this range is likely to sufficiently exert its effects and may make it easy to avoid a decrease in battery characteristics such as high-load discharge characteristics. The amount of the auxiliary agent is more preferably 0.1 mass % or more, still more preferably 0.2 mass % or more, while also more preferably 3 mass % or less, still more preferably 1 mass % or less.

The electrolyte solution of the present invention may further contain any of cyclic or acyclic carboxylic acid esters, ether compounds, nitrogen-containing compounds, boron-containing compounds, organic silicon-containing compounds, fireproof agents (flame retardants), surfactants, permittivity-improving additives, and improvers for cycle characteristics and rate characteristics, to the extent that the effects of the present invention are not impaired.

Examples of the cyclic carboxylic acid esters include those having 3 to 12 carbon atoms in total in the structural formula. Specific examples thereof include gamma-butyrolactone, gamma-valerolactone, gamma-caprolactone, and epsilon-caprolactone. Particularly preferred is gamma-butyrolactone because it can improve the characteristics of an electrochemical device owing to improvement in the degree of dissociation of lithium ions.

In general, the amount of the cyclic carboxylic acid ester is preferably 0.1 mass % or more, more preferably 1 mass % or more, in 100 mass % of the solvent. The cyclic carboxylic acid ester in an amount within this range is likely to improve the electric conductivity of the electrolyte solution, and thus to improve the large-current discharge characteristics of an electrochemical device. The amount of the cyclic carboxylic acid ester is also preferably 10 mass % or less, more preferably 5 mass % or less. Such an upper limit may allow the electrolyte solution to have a viscosity within an appropriate range, may make it possible to avoid a decrease in electric conductivity, may suppress an increase in resistance of a negative electrode, and may allow an electrochemical device to have large-current discharge characteristics within a favorable range.

The cyclic carboxylic acid ester to be suitably used may be a fluorinated cyclic carboxylic acid ester (fluorolactone). Examples of the fluorolactone include fluorolactones represented by the following formula (C):

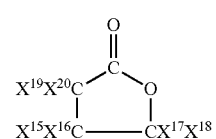

(C)

wherein $X^{15}$ to $X^{20}$ may be the same as or different from each other, and are each —H, —F, —Cl, —CH$_3$, or a fluorinated alkyl group, at least one of $X^{15}$ to $X^{20}$ being a fluorinated alkyl group.

Examples of the fluorinated alkyl group for $X^{15}$ to $X^{20}$ include —CFH$_2$, —CF$_2$H, —CF$_3$, —CH$_2$CF$_3$, —CF$_2$CF$_3$, —CH$_2$CF$_2$CF$_3$, and —CF(CF$_3$)$_2$. In order to achieve high oxidation resistance and an effect of improving the safety, —CH$_2$CF$_3$ and —CH$_2$CF$_2$CF$_3$ are preferred.

As long as at least one of $X^{15}$ to $X^{20}$ is a fluorinated alkyl group, —H, —F, —Cl, —CH$_3$ or a fluorinated alkyl group may substitute for one of $X^{15}$ to $X^{20}$ or a plurality thereof. In order to achieve a good solubility of the electrolyte salt, they preferably substitute for 1 to 3 sites, more preferably 1 or 2 site(s).

The substitution site of the fluorinated alkyl group may be at any of the above sites. In order to achieve a good synthesizing yield, the substitution site is preferably $X^{17}$ and/or $X^{18}$. In particular, $X^{17}$ or $X^{18}$ is preferably a fluorinated alkyl group, especially, —$CH_2CF_3$ or —$CH_2CF_2CF_3$. The substituent for $X^{15}$ to $X^{20}$ other than the fluorinated alkyl group is —H, —F, —Cl, or $CH_3$. In order to achieve a good solubility of the electrolyte salt, —H is preferred.

In addition to those represented by the above formula, the fluorolactone may also be a fluorolactone represented by the following formula (D):

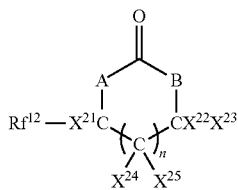

(D)

wherein one of A and B is $CX^{26}X^{27}$ (where $X^{26}$ and $X^{27}$ may be the same as or different from each other, and are each —H, —F, —Cl, —$CF_3$, —$CH_3$, or an alkylene group in which a hydrogen atom may optionally be replaced by a halogen atom and which may optionally has a hetero atom in the chain) and the other is an oxygen atom; $Rf^{12}$ is a fluorinated alkyl group or fluorinated alkoxy group which may optionally have an ether bond; $X^{21}$ and $X^{22}$ may be the same as or different from each other, and are each —H, —F, —Cl, —$CF_3$, or $CH_3$; $X^{23}$ to $X^{25}$ may be the same as or different from each other, and are each —H, —F, —Cl, or an alkyl group in which a hydrogen atom may optionally be replaced by a halogen atom and which may optionally contain a hetero atom in the chain; and n=0 or 1.

Preferred examples of the fluorolactone represented by the formula (D) include a 5-membered ring structure represented by the following formula (E):

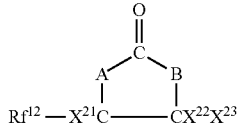

(E)

(wherein A, B, $Rf^{12}$, $X^{21}$, $X^{22}$, and $X^{23}$ are defined in the same manner as in the formula (D)) because it is easily synthesized and has good chemical stability. Further, in relation to the combination of A and B, fluorolactones represented by the following formula (F):

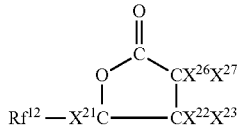

(F)

(wherein $Rf^{12}$, $X^{21}$, $X^{22}$, $X^{23}$, $X^{26}$, and $X^{27}$ are defined in the same manner as in the formula (D)) and fluorolactones represented by the following formula (G):

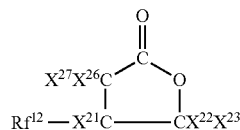

(G)

(wherein $Rf^{12}$, $X^{21}$, $X^{22}$, $X^{23}$, $X^{26}$, and $X^{27}$ are defined in the same manner as in the formula (D)) may be mentioned.

In order to particularly achieve excellent characteristics such as a high permittivity and a high withstand voltage, and to improve the characteristics of the electrolyte solution in the present invention, for example, to achieve a good solubility of the electrolyte salt and to reduce the internal resistance well, those represented by the following formulas:

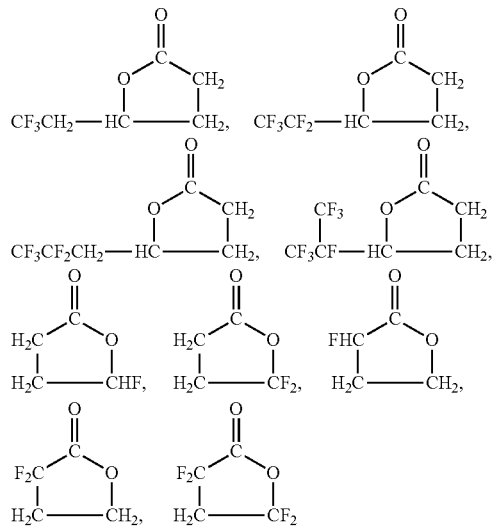

may be mentioned.

Containing a fluorinated cyclic carboxylic acid ester leads to effects of, for example, improving the ion conductivity, improving the safety, and improving the stability at high temperature.

Examples of the acyclic carboxylic acid ester include those having three to seven carbon atoms in total in the structural formula. Specific examples thereof include methyl acetate, ethyl acetate, n-propyl acetate, isopropyl acetate, n-butyl acetate, isobutyl acetate, t-butyl acetate, methyl propionate, ethyl propionate, n-propyl propionate, isopropyl propionate, n-butyl propionate, isobutyl propionate, t-butyl propionate, methyl butyrate, ethyl butyrate, n-propyl butyrate, isopropyl butyrate, methyl isobutyrate, ethyl isobutyrate, n-propyl isobutyrate, and isopropyl isobutyrate.

In order to improve the ion conductivity owing to a decrease in viscosity, preferred are methyl acetate, ethyl acetate, n-propyl acetate, n-butyl acetate, methyl propionate, ethyl propionate, n-propyl propionate, isopropyl propionate, methyl butyrate, and ethyl butyrate, for example.

Also, a fluorinated acyclic carboxylic acid ester may also suitably be used. Preferred examples of the fluorine-containing ester include fluorinated acyclic carboxylic acid esters represented by the following formula (H):

$Rf^{10}COORf^{11}$ (H)

(wherein $Rf^{10}$ is a C1-C2 fluorinated alkyl group; and $Rf^{11}$ is a C1-C4 fluorinated alkyl group) because they are high in incombustibility and have good compatibility with other solvents and good oxidation resistance.

Examples of the group for $Rf^{10}$ include $CF_3-$, $CF_3CF_2-$, $HCF_2CF_2-$, $HCF_2-$, $CH_3CF_2-$, and $CF_3CH_2-$. In order to achieve good rate characteristics, $CF_3-$ and $CF_3CF_2-$ are particularly preferred.

Examples of the group for $Rf^{11}$ include $-CF_3$, $-CF_2CF_3$, $-CH(CF_3)_2$, $-CH_2CF_3$, $-CH_2CH_2CF_3$, $-CH_2CF_2CFHCF_3$, $-CH_2C_2F_5$, $-CH_2CF_2CF_2H$, $-CH_2CH_2C_2F_5$, $-CH_2CF_2CF_3$, and $-CH_2CF_2CF_2CF_3$. In order to achieve good compatibility with other solvents, $-CH_2CF_3$, $-CH(CF_3)_2$, $-CH_2C_2F_5$, and $-CH_2CF_2CF_2H$ are particularly preferred.

Specifically, for example, the fluorinated acyclic carboxylic acid ester may include one or two or more of $CF_3C(=O)OCH_2CF_3$, $CF_3C(=O)OCH_2CH_2CF_3$, $CF_3C(=O)OCH_2C_2F_5$, $CF_3C(=O) OCH_2CF_2CF_2H$, and $CF_3C(=O)OCH(CF_3)_2$. In order to achieve good compatibility with other solvents and good rate characteristics, $CF_3C(=O)OCH_2C_2F_5$, $CF_3C(=O)OCH_2CF_2CF_2H$, $CF_3C(=O)OCH_2CF_3$, and $CF_3C(=O)OCH(CF_3)_2$ are particularly preferred.

The ether compound is preferably a C3-C10 acyclic ether or a C3-C6 cyclic ether.

Examples of the C3-C10 acyclic ether include diethyl ether, di-n-butyl ether, dimethoxy methane, methoxy ethoxy methane, diethoxy methane, dimethoxy ethane, methoxy ethoxy ethane, diethoxy ethane, ethylene glycol di-n-propyl ether, ethylene glycol di-n-butyl ether, and diethylene glycol dimethyl ether.

The ether compound may suitably be a fluorinated ether.

One example of the fluorinated ether is a fluorinated ether (I) represented by the following formula (I):

$$Rf^3-O-Rf^4 \qquad (I)$$

(wherein $Rf^3$ and $Rf^4$ may be the same as or different from each other, and are each a C1-C10 alkyl group or a C1-C10 fluorinated alkyl group, at least one of $Rf^3$ and $Rf^4$ being a fluorinated alkyl group). Containing the fluorinated ether (I) can improve the incombustibility of the electrolyte solution, as well as improve the stability and safety at high temperature and high voltage.

In the formula (I), at least one of $Rf^3$ and $Rf^4$ has only to be a C1-C10 fluorinated alkyl group. In order to further improve the incombustibility and the stability and safety at high temperature and high voltage of the electrolyte solution, both $Rf^3$ and $Rf^4$ are preferably a C1-C10 fluorinated alkyl group. In this case, $Rf^3$ and $Rf^4$ may be the same as or different from each other.

In particular, more preferably, $Rf^3$ and $Rf^4$ are the same as or different from each other, and $Rf^3$ is a C3-C6 fluorinated alkyl group and $Rf^4$ is a C2-C6 fluorinated alkyl group.

If the sum of the carbon numbers of $Rf^3$ and $Rf^4$ is too small, the fluorinated ether may have too low a boiling point. If the carbon number of $Rf^3$ or $Rf^4$ is too large, the solubility of the electrolyte salt may be low, which may have a bad influence on the compatibility with other solvents, and the viscosity may be high so that the rate characteristics may be poor. In order to achieve excellent boiling point and rate characteristics, the carbon number of $Rf^3$ is 3 or 4 and the carbon number of $Rf^4$ is 2 or 3, advantageously.

The fluorinated ether (I) preferably has a fluorine content of 40 to 75 mass %. The fluorinated ether (I) having a fluorine content within this range may lead to particularly excellent balance between the incombustibility and the compatibility. The above range is also preferred for good oxidation resistance and safety.

The lower limit of the fluorine content is more preferably 45 mass %, still more preferably 50 mass %, particularly preferably 55 mass %. The upper limit thereof is more preferably 70 mass %, still more preferably 66 mass %.

The fluorine content of the fluorinated ether (I) is a value calculated by the formula: {(number of fluorine atoms×19)/(molecular weight of fluorinated ether (I))}×100(%) based on the structural formula of the fluorinated ether (I).

Examples of the group for $Rf^3$ include $CF_3CF_2CH_2-$, $CF_3CFHCF_2-$, $HCF_2CF_2CF_2-$, $HCF_2CF_2CH_2-$, $CF_3CF_2CH_2CH_2-$, $CF_3CFHCF_2CH_2-$, $HCF_2CF_2CF_2CF_2-$, $HCF_2CF_2CF_2CH_2-$, $HCF_2CF_2CH_2CH_2-$, and $HCF_2CF(CF_3)CH_2-$. Examples of the group for $Rf^4$ include $-CH_2CF_2CF_3$, $-CF_2CFHCF_3$, $-CF_2CF_2CF_2H$, $-CH_2CF_2CF_2H$, $-CH_2CH_2CF_2CF_3$, $-CH_2CF_2CFHCF_3$, $-CF_2CF_2CF_2CF_2H$, $-CH_2CF_2CF_2CF_2H$, $-CH_2CH_2CF_2CF_2H$, $-CH_2CF(CF_3)CF_2H$, $-CF_2CF_2H$, $-CH_2CF_2H$, and $-CF_2CH_3$.

Specific examples of the fluorinated ether (I) include $HCF_2CF_2CH_2OCF_2CF_2H$, $CF_3CF_2CH_2OCF_2CF_2H$, $HCF_2CF_2CH_2OCF_2CFHCF_3$, $CF_3CF_2CH_2OCF_2CFHCF_3$, $C_6F_{13}OCH_3$, $C_6F_{13}OC_2H_5$, $C_8F_{17}OCH_3$, $C_8F_{17}OC_2H_5$, $CF_3CFHCF_2CH(CH_3)OCF_2CFHCF_3$, $HCF_2CF_2OCH(C_2H_5)_2$, $HCF_2CF_2OC_4H_9$, $HCF_2CF_2OCH_2CH(C_2H_5)_2$, and $HCF_2CF_2OCH_2CH(CH_3)_2$.

In particular, those having $HCF_2-$ or $CF_3CFH-$ at one end or both ends can provide a fluorinated ether (I) excellent in polarizability and having a high boiling point. The boiling point of the fluorinated ether (I) is preferably 67° C. to 120° C. It is more preferably 80° C. or higher, still more preferably 90° C. or higher.

Such a fluorinated ether (I) may include one or two or more of $CF_3CH_2OCF_2CFHCF_3$, $CF_3CF_2CH_2OCF_2CFHCF_3$, $HCF_2CF_2CH_2OCF_2CFHCF_3$, $HCF_2CF_2CH_2OCH_2CF_2CF_2H$, $CF_3CFHCF_2CH_2OCF_2CFHCF_3$, $HCF_2CF_2CH_2OCF_2CF_2H$, $CF_3CF_2CH_2OCF_2CF_2H$, and the like.

In order to advantageously achieve a high boiling point, good compatibility with other solvents, and a good solubility of the electrolyte salt, the fluorinated ether (I) is preferably at least one selected from the group consisting of $HCF_2CF_2CH_2OCF_2CFHCF_3$ (boiling point: 106° C.), $CF_3CF_2CH_2OCF_2CFHCF_3$ (boiling point: 82° C.), $HCF_2CF_2CH_2OCF_2CF_2H$ (boiling point: 92° C.), and $CF_3CF_2CH_2OCF_2CF_2H$ (boiling point: 68° C.), more preferably at least one selected from the group consisting of $HCF_2CF_2CH_2OCF_2CFHCF_3$ (boiling point: 106° C.) and $HCF_2CF_2CH_2OCF_2CF_2H$ (boiling point: 92° C.)

Examples of the C3-C6 cyclic ether include 1,3-dioxane, 2-methyl-1,3-dioxane, 4-methyl-1,3-dioxane, 1,4-dioxane, and fluorinated compounds thereof. Preferred are dimethoxy methane, diethoxy methane, ethoxy methoxy methane, ethylene glycol n-propyl ether, ethylene glycol di-n-butyl ether, and diethylene glycol dimethyl ether because they have a high ability to solvate with lithium ions and improve the degree of ion dissociation. Particularly preferred are dimethoxy methane, diethoxy methane, and ethoxy methoxy methane because they have a low viscosity and give a high ion conductivity.

Examples of the nitrogen-containing compounds include nitrile, fluorine-containing nitrile, carboxylic acid amide, fluorine-containing carboxylic acid amide, sulfonic acid amide, and fluorine-containing sulfonic acid amide. Also, 1-methyl-2-pyrrolidinone, 1-methyl-2-piperidone, 3-methyl-2-oxazolidinone, 1,3-dimethyl-2-imidazolidinone, and N-methylsuccinimide may also be used.

Examples of the boron-containing compounds include boric acid esters such as trimethyl borate and triethyl borate, boric acid ethers, and alkyl borates.

Examples of the organic silicon-containing compounds include $(CH_3)_4$—Si and $(CH_3)_3$—Si—Si$(CH_3)_3$.

Examples of the fireproof agents (flame retardants) include phosphoric acid esters and phosphazene-based compounds. Examples of the phosphoric acid esters include fluoroalkyl phosphates, non-fluoroalkyl phosphates, and aryl phosphates. Particularly preferred are fluoroalkyl phosphates because they can show an incombustible effect even at a small amount.

Specific examples of the fluoroalkyl phosphates include fluorodialkyl phosphates disclosed in JP H11-233141 A, cyclic alkyl phosphates disclosed in JP H11-283669 A, and fluorotrialkyl phosphates.

Preferred as the fireproof agents (flame retardants) are $(CH_3O)_3P=O$, $(CF_3CH_2O)_3P=O$, $(HCF_2CH_2O)_3P=O$, $(CF_3CF_2CH_2)_3P=O$, and $(HCF_2CF_2CH_2)_3P=O$, for example.

The surfactant may be any of cationic surfactants, anionic surfactants, nonionic surfactants, and amphoteric surfactants. In order to achieve good cycle characteristics and rate characteristics, the surfactant is preferably one containing a fluorine atom.

Preferred examples of such a surfactant containing a fluorine atom include fluorine-containing carboxylic acid salts represented by the following formula (3):

(wherein $Rf^5$ is a C3-C10 fluoroalkyl group which may optionally have an ether bond; and $M^+$ is $Li^+$, $Na^+$, $K^+$, or $NHR'_3{}^+$ (where R's may be the same as or different from each other, and are each H or a C1-C3 alkyl group)), and fluorine-containing sulfonic acid salts represented by the following formula (4):

(wherein $Rf^6$ is a C3-C10 fluoroalkyl group which may optionally have an ether bond; and $M^+$ is $Li^+$, $Na^+$, $K^+$, or $NHR'_3{}^+$ (where R's may be the same as or different from each other, and are each H or a C1-C3 alkyl group)).

In order to reduce the surface tension of the electrolyte solution without deteriorating the charge and discharge cycle characteristics, the amount of the surfactant is preferably 0.01 to 2 mass % in the electrolyte solution.

Examples of the permittivity-improving additives include sulfolane, methyl sulfolane, γ-butyrolactone, γ-valerolactone, acetonitrile, and propionitrile.

Examples of the improvers for cycle characteristics and rate characteristics include methyl acetate, ethyl acetate, tetrahydrofuran, and 1,4-dioxane.

The electrolyte solution of the present invention may be combined with a polymer material and thereby formed into a gel-like (plasticized), gel electrolyte solution.

Examples of such a polymer material include conventionally known polyethylene oxide and polypropylene oxide, modified products thereof (see JP H08-222270 A, JP 2002-100405 A); polyacrylate-based polymers, polyacrylonitrile, and fluororesins such as polyvinylidene fluoride and vinylidene fluoride-hexafluoropropylene copolymers (see JP H04-506726 T, JP H08-507407 T, JP H10-294131 A); complexes of any of these fluororesins and any hydrocarbon resin (see JP H11-35765 A, JP H11-86630 A). In particular, polyvinylidene fluoride or a vinylidene fluoride-hexafluoropropylene copolymer is preferably used as a polymer material for gel electrolytes.

The electrolyte solution of the present invention may also contain an ion conductive compound disclosed in Japanese Patent Application No. 2004-301934.

This ion conductive compound is an amorphous fluoropolyether compound having a fluorine-containing group at a side chain and is represented by the formula (1-1):

$$A\text{-}(D)\text{-}B \qquad (1\text{-}1)$$

wherein D is represented by the formula (2-1):

$$\text{-}(D1)_n\text{-}(FAE)_m\text{-}(AE)_p\text{-}E\text{-}(Y)_q\text{—} \qquad (2\text{-}1)$$

[wherein

D1 is an ether unit having a fluoroether group at a side chain and is represented by the formula (2a):

(wherein Rf is a fluoroether group which may optionally have a cross-linkable functional group; and $R^{10}$ is a group or a bond that links Rf and the main chain);

FAE is an ether unit having a fluorinated alkyl group at a side chain and is represented by the formula (2b):

(wherein Rfa is a hydrogen atom or a fluorinated alkyl group which may optionally have a cross-linkable functional group; and $R^{11}$ is a group or a bond that links Rfa and the main chain);

AE is an ether unit represented by the formula (2c):

(wherein $R^{13}$ is a hydrogen atom, an alkyl group which may optionally have a cross-linkable functional group, an aliphatic cyclic hydrocarbon group which may optionally have a cross-linkable functional group, or an aromatic hydrocarbon group which may optionally have a cross-linkable functional group; and $R^{12}$ is a group or a bond that links $R^{13}$ and the main chain);

Y is a unit having at least one selected from the formulas (2d-1) to (2d-3):

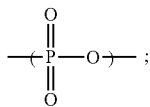

(2d-3)

n is an integer of 0 to 200;
m is an integer of 0 to 200;
p is an integer of 0 to 10000;
q is an integer of 1 to 100;
n+m is not 0; and
the bonding order of D1, FAE, AE, and Y is not specified]; and A and B may be the same as or different from each other, and are each a hydrogen atom, an alkyl group which may optionally have a fluorine atom and/or a cross-linkable functional group, a phenyl group which may optionally have a fluorine atom and/or a cross-linkable functional group, a —COOH group, —OR (where R is a hydrogen atom or an alkyl group which may optionally have a fluorine atom and/or a cross-linkable functional group), an ester group, or a carbonate group (if an end of D is an oxygen atom, A and B each are none of a —COOH group, —OR, an ester group, and a carbonate group).

The electrolyte solution of the present invention may further contain any other additives, if necessary. Examples of such other additives include metal oxides and glass.

The electrolyte solution of the present invention may be prepared by any method using the aforementioned components.

As mentioned above, the electrolyte solution of the present invention contains a solvent containing the fluorinated saturated cyclic carbonate and the specific fluorinated acyclic carbonate, and the specific sulfur-containing compound. Thus, use of the electrolyte solution of the present invention enables production of an electrochemical device having a high voltage and being excellent in high-temperature storage characteristics and cycle characteristics. The electrolyte solution of the present invention can be suitably applied to electrochemical devices such as lithium ion secondary batteries and electric double-layer capacitors. An electrochemical device including the electrolyte solution of the present invention is also one aspect of the present invention.

Examples of the electrochemical device include lithium ion secondary batteries, capacitors (electric double-layer capacitors), radical batteries, solar cells (in particular, dye-sensitized solar cells), fuel cells, various electrochemical sensors, electrochromic elements, electrochemical switching elements, aluminum electrolytic capacitors, and tantalum electrolytic capacitors. Preferred are lithium ion secondary batteries and electric double-layer capacitors.

A module including the above electrochemical device is also one aspect of the present invention.

The present invention also relates to a lithium ion secondary battery including the electrolyte solution of the present invention. The lithium ion secondary battery of the present invention includes a positive electrode, a negative electrode, and the aforementioned electrolyte solution.

<Negative Electrode>

First, a negative electrode active material used for the negative electrode is described. The negative electrode active material may be any material that can electrochemically occlude and release lithium ions. Specific examples thereof include carbonaceous materials, alloyed materials, and lithium-containing metal complex oxide materials. These may be used alone or in any combination of two or more.

(Negative Electrode Active Material)

Examples of the negative electrode active material include carbonaceous materials, alloyed materials, and lithium-containing metal complex oxide materials.

In order to achieve a good balance between the initial irreversible capacity and the high-current-density charge and discharge characteristics, the carbonaceous materials to be used as negative electrode active materials are preferably selected from:

(1) natural graphite;
(2) carbonaceous materials obtained by one or more heat treatments at 400° C. to 3200° C. of artificial carbonaceous substances or artificial graphite substances;
(3) carbonaceous materials in which the negative electrode active material layer includes at least two or more carbonaceous matters having different crystallinities and/or has an interface between the carbonaceous matters having different crystallinities; and
(4) carbonaceous materials in which the negative electrode active material layer includes at least two or more carbonaceous matters having different orientations and/or has an interface between the carbonaceous matters having different orientations. The carbonaceous materials (1) to (4) may be used alone or in any combination of two or more at any ratio.

Examples of the artificial carbonaceous substances and the artificial graphite substances of the above carbonaceous materials (2) include natural graphite, coal-based coke, petroleum-based coke, coal-based pitch, petroleum-based pitch, and those prepared by oxidizing these pitches; needle coke, pitch coke, and carbon materials prepared by partially graphitizing these cokes; pyrolysates of organic matter such as furnace black, acetylene black, and pitch-based carbon fibers; carbonizable organic matter and carbides thereof; and solutions prepared by dissolving carbonizable organic matter in a low-molecular-weight organic solvent such as benzene, toluene, xylene, quinoline, or n-hexane, and carbides thereof.

The alloyed materials to be used as negative electrode active materials may be any material that can occlude and release lithium, and examples thereof include simple lithium, simple metals and alloys that constitute lithium alloys, and compounds based thereon, such as oxides, carbides, nitrides, silicides, sulfides, and phosphides thereof. The simple metals and alloys constituting lithium alloys are preferably materials containing any of metal or semi-metal elements (i.e., excluding carbon) in the Groups 13 and 14, more preferably simple metal of aluminum, silicon, and tin (hereinafter, also referred to as "specific metal elements"), and alloys or compounds containing any of these atoms. These materials may be used alone or in combination of two or more at any ratio.

Examples of the negative electrode active material having at least one atom selected from the specific metal elements include simple metal of any one specific metal element, alloys of two or more specific metal elements, alloys of one or two or more specific metal elements and one or two or more other metal elements, compounds containing one or two or more specific metal elements, and composite compounds such as oxides, carbides, nitrides, silicides, sulfides, and phosphides of these compounds. Use of such a simple metal, alloy, or metal compound as the negative electrode active material can give a high capacity to batteries.

Examples thereof further include compounds in which any of the above composite compounds are complexly bonded with several elements such as simple metals, alloys, and non-metal elements. Specifically, in the case of silicon or tin, for example, an alloy of this element and a metal that does not serve as a negative electrode may be used. In the case of tin, for example, a composite compound including a combination of five or six elements, including tin, a metal (excluding silicon) that serves as a negative electrode, a metal that does not serve as a negative electrode, and a non-metal element, may be used.

In order to achieve a high capacity per unit mass when formed into batteries, preferred among these negative electrode active materials are simple metal of any one specific metal element, an alloy of any two or more specific metal elements, and an oxide, carbide, or nitride of a specific metal element. For a good capacity per unit mass and small environmental load, simple metal, an alloy, oxide, carbide, or nitride of silicon and/or tin is particularly preferred.

The lithium-containing metal complex oxide materials to be used as negative electrode active materials may be any material that can occlude and release lithium. In order to achieve good high-current-density charge and discharge characteristics, materials containing titanium and lithium are preferred, lithium-containing metal complex oxide materials containing titanium are more preferred, and complex oxides of lithium and titanium (hereinafter, also abbreviated as "lithium titanium complex oxides") are still more preferred. In other words, use of a spinel-structured lithium titanium complex oxide contained in the negative electrode active material for electrochemical devices is particularly preferred because such a compound markedly reduces the output resistance.

Also preferred are lithium titanium complex oxides in which the lithium and/or titanium therein are/is replaced by any other metal element such as at least one element selected from the group consisting of Na, K, Co, Al, Fe, Ti, Mg, Cr, Ga, Cu, Zn, and Nb.

For a stable structure in doping and dedoping lithium ions, the metal oxide is preferably a lithium titanium complex oxide represented by the following formula (C) wherein $0.7 \leq x \leq 1.5$, $1.5 \leq y \leq 2.3$, $0 \leq z \leq 1.6$.

$$Li_xTi_yM_zO_4 \qquad (C)$$

In the formula (C), M is at least one element selected from the group consisting of Na, K, Co, Al, Fe, Ti, Mg, Cr, Ga, Cu, Zn, and Nb.

In order to achieve a good balance of the battery performance, particularly preferred compositions represented by the formula (C) are those satisfying one of the following:

$1.2 \leq x \leq 1.4, 1.5 \leq y \leq 1.7, z=0$ (a)

$0.9 \leq x \leq 1.1, 1.9 \leq y \leq 2.1, z=0$ (b)

$0.7 \leq x \leq 0.9, 2.1 \leq y \leq 2.3, z=0$ (c)

Particularly preferred representative compositions of the compound are $Li_{4/3}Ti_{5/3}O_4$, corresponding to the composition (a), $Li_1Ti_2O_4$, corresponding to the composition (b), and $Li_{4/5}Ti_{11/5}O_4$, corresponding to the composition (c).

Preferred examples of the structure satisfying $Z \neq 0$ include $Li_{4/3}Ti_{4/3}Al_{1/3}O_4$.

<Configuration and Production Method of Negative Electrode>

The electrode can be produced by any known method that does not significantly impair the effects of the present invention. For example, the negative electrode may be produced by mixing a negative electrode active material with a binder (binding agent) and a solvent, and if necessary, a thickening agent, a conductive material, filler, and other components, to form slurry; applying this slurry to a current collector; drying the slurry; and pressing the workpiece.

In the case of an alloyed material, one example of the production method is a method in which a thin film layer (negative electrode active material layer) containing the above negative electrode active material is produced by vapor deposition, sputtering, plating, or the like technique.

(Binding Agent)

The binder for binding the negative electrode active material may be any material that is stable against the electrolyte solution and a solvent to be used in production of the electrode.

Specific examples thereof include resin polymers such as polyethylene, polypropylene, polyethylene terephthalate, polymethyl methacrylate, aromatic polyamide, polyimide, cellulose, and nitro cellulose; rubbery polymers such as styrene/butadiene rubber (SBR), isoprene rubber, polybutadiene rubber, fluororubber, acrylonitrile/butadiene rubber (NBR), and ethylene/propylene rubber; styrene/butadiene/styrene block copolymers and hydrogenated products thereof; thermoplastic elastomeric polymers such as ethylene/propylene/diene terpolymers (EPDM), styrene/ethylene/butadiene/styrene copolymers, styrene/isoprene/styrene block copolymers, and hydrogenated products thereof; soft resin polymers such as syndiotactic-1,2-polybutadiene, polyvinyl acetate, ethylene/vinyl acetate copolymers, and propylene/α-olefin copolymers; fluoropolymers such as polyvinylidene fluoride, polytetrafluoroethylene, fluorinated polyvinylidene fluoride, and tetrafluoroethylene/ethylene copolymers; and polymer compositions having an ion conductivity of alkali metal ions (especially, lithium ions). These agents may be used alone or in any combination of two or more at any ratio.

The proportion of the binder relative to the negative electrode active material is preferably 0.1 mass % or more, more preferably 0.5 mass % or more, particularly preferably 0.6 mass % or more, while also preferably 20 mass % or less, more preferably 15 mass % or less, still more preferably 10 mass % or less, particularly preferably 8 mass % or less. If the proportion of the binder relative to the negative electrode active material exceeds the above range, a large proportion of the binder may fail to contribute to the battery capacity, so that the battery capacity may decrease. If the proportion thereof is lower than the above range, the resulting negative electrode may have a lowered strength.

In particular, in the case of using a rubbery polymer typified by SBR as a main component, the proportion of the binder relative to the negative electrode active material is usually 0.1 mass % or more, preferably 0.5 mass % or more, more preferably 0.6 mass % or more, while usually 5 mass % or less, preferably 3 mass % or less, more preferably 2 mass % or less. In the case of using a fluoropolymer typified by polyvinylidene fluoride as a main component, the proportion of the binder relative to the negative electrode active material is usually 1 mass % or more, preferably 2 mass % or more, more preferably 3 mass % or more, while usually 15 mass % or less, preferably 10 mass % or less, more preferably 8 mass % or less.

(Slurry-Forming Solvent)

A solvent for forming slurry may be any solvent that can dissolve or disperse the negative electrode active material and the binder, and a thickening agent and a conductive material that are used as necessary. The slurry-forming solvent may be either an aqueous solvent or an organic solvent.

Examples of the aqueous solvent include water and alcohols. Examples of the organic solvent include N-methylpyrrolidone (NMP), dimethyl formamide, dimethyl acetamide, methyl ethyl ketone, cyclohexanone, methyl acetate, methyl acrylate, diethyl triamine, N,N-dimethyl aminopropyl amine, tetrahydrofuran (THF), toluene, acetone, diethyl ether, dimethyl acetamide, hexamethyl phospharamide, dimethyl sulfoxide, benzene, xylene, quinoline, pyridine, methyl naphthalene, and hexane.

In the case of an aqueous solvent, preferably, the aqueous solvent is made to contain a component such as a dispersant together with a thickening agent, and is formed into slurry using a latex such as SBR. These solvents may be used alone or in any combination of two or more at any ratio.

(Current Collector)

A current collector for holding the negative electrode active material may be any known one. Examples of the negative electrode current collector include metal materials such as aluminum, copper, nickel, stainless steel, and nickel-plated steel. For easy processing and cost efficiency, copper is particularly preferred.

If the current collector is a metal material, the current collector may be in the form of, for example, metal foil, metal cylinder, metal coil, metal plate, metal film, expanded metal, punched metal, or metal foam. Preferred is a metal film, more preferred is copper foil, and still more preferred is rolled copper foil prepared by rolling or electrolyzed copper foil prepared by electrolysis. Each of these may be used as a current collector.

The current collector usually has a thickness of 1 μm or larger, preferably 5 μm or larger, while also usually 100 μm or smaller, preferably 50 μm or smaller. Too thick a negative electrode current collector may cause an excessive decrease in capacity of the whole battery, whereas too thin a current collector may be difficult to handle.

(Ratio Between Thicknesses of Current Collector and Negative Electrode Active Material Layer)

The ratio between the thicknesses of the current collector and the negative electrode active material layer may be any value, and the value "(thickness of negative electrode active material layer on one side immediately before filling of electrolyte solution)/(thickness of current collector)" is preferably 150 or smaller, still more preferably 20 or smaller, particularly preferably 10 or smaller, while preferably 0.1 or greater, still more preferably 0.4 or greater, particularly preferably 1 or greater. If the ratio between the thicknesses of the current collector and the negative electrode active material layer exceeds the above range, the current collector may generate heat due to Joule heat during high-current-density charge and discharge. If the ratio is below the above range, the volume proportion of the current collector to the negative electrode active material is high, so that the battery capacity may be low.

<Positive Electrode>

(Positive Electrode Active Material)

A positive electrode active material used for the positive electrode is described. The positive electrode active material used in the present invention is preferably a lithium transition metal compound powder that can intercalate and release lithium ions and that satisfies one of the following three conditions:

1. a lithium transition metal compound powder having a pH of 10.8 or higher;

2. a lithium transition metal compound powder containing a compound having at least one element selected from Mo, W, Nb, Ta, and Re and a compound having a B element and/or a Bi element; and 3. a lithium transition metal compound powder having a peak within a pore radius range of not smaller than 80 nm but smaller than 800 nm.

(Lithium Transition Metal Compound)

The lithium transition metal compound is a compound having a structure that can release and intercalate Li ions, and examples thereof include sulfides, phosphate compounds, and lithium transition metal complex oxides. Examples of the sulfides include compounds having a two-dimensional lamellar structure such as $TiS_2$ and $MoS_2$ and chevrel compounds having a firm three-dimensional skeleton structure represented by $Me_xMo_6S_8$ (wherein Me is a transition metal such as Pb, Ag, or Cu). Examples of the phosphate compounds include those having an olivine structure generally represented by $LiMePO_4$ (wherein Me is at least one transition metal), and specific examples thereof include $LiFePO_4$, $LiCoPO_4$, $LiNiPO_4$, and $LiMnPO_4$. Examples of the lithium transition metal complex oxides include those having a three-dimensionally diffusible spinel structure and those having a lamellar structure that enables two-dimensional diffusion of lithium ions. Those having a spinel structure are generally represented by $LiMe_2O_4$ (wherein Me is at least one transition metal), and specific examples thereof include $LiMn_2O_4$, $LiCoMnO_4$, $LiNi_{0.5}Mn_{1.5}O_4$, and $LiCoVO_4$. Those having a lamellar structure are generally represented by $LiMeO_2$ (wherein Me is at least one transition metal), and specific examples thereof include $LiCoO_2$, $LiNiO_2$, $LiNi_{1-x}Co_xO_2$, $LiNi_{1-x-y}Co_xMn_yO_2$, $LiNi_{0.5}Mn_{0.5}O_2$, $Li_{1.2}Cr_{0.4}Mn_{0.4}O_2$, $Li_{1.2}Cr_{0.4}Ti_{0.4}O_2$, and $LiMnO_2$.

Particularly preferred is a lithium nickel manganese cobalt complex oxide or $LiCoO_2$.

For good diffusion of lithium ions, the lithium transition metal compound powder preferably has an olivine structure, a spinel structure, or a lamellar structure. Particularly preferred is one having a lamellar structure.

The lithium transition metal compound powder may include any additional element. The additional element is one or more selected from B, Na, Mg, Al, K, Ca, Ti, V, Cr, Fe, Cu, Zn, Sr, Y, Zr, Nb, Ru, Rh, Pd, Ag, In, Sb, Te, Ba, Ta, Mo, W, Re, Os, Ir, Pt, Au, Pb, La, Ce, Pr, Nd, Sm, Eu, Gd, Tb, Dy, Ho, Er, Tm, Yb, Lu, Bi, N, F, S, Cl, Br, and I. These additional elements may be introduced into the crystal structure of the lithium nickel manganese cobalt complex oxide, or may not be introduced into the crystal structure of the lithium nickel manganese cobalt complex oxide but be unevenly distributed as simple substances or compounds on surfaces or grain boundaries of the particles.

(Additives)

In the present invention, a compound (hereinafter, also referred to as an "additive 1") having at least one or more elements selected from Mo, W, Nb, Ta, and Re (hereinafter, also referred to as "additive elements 1") and a compound (hereinafter, also referred to as an "additive 2") having at least one element selected from B and Bi (hereinafter, also referred to as additive elements 2") may be used.

In order to achieve a large effect, Mo or W is preferred, and W is most preferred, among these additive elements 1. Further, B is preferred among these additive elements 2 because B is inexpensively available as an industrial material and is a light element.

The compound (additive 1) having an additive element 1 may be of any type that leads to the effects of the present invention, and is usually an oxide.

Examples of the additive 1 include $MoO$, $MoO_2$, $MOO_3$, $MoO_x$, $Mo_2O_3$, $Mo_2O_5$, $Li_2MoO_4$, $WO$, $WO_2$, $WO_3$, $WO_x$, $W_2O_3$, $W_2O_5$, $W_{18}O_{49}$, $W_{20}O_{58}$, $W_{24}O_{70}$, $W_{25}O_{73}$, $W_{40}O_{118}$, $Li_2WO_4$, $NbO$, $NbO_2$, $Nb_2O_3$, $Nb_2O_5$, $Nb_2O_5.nH_2O$, $LiNbO_3$, $Ta_2O$, $Ta_2O_5$, $LiTaO_3$, $ReO_2$, $ReO_3$, $Re_2O_3$, and $Re_2O_7$. Preferred are $MoO_3$, $Li_2MoO_4$, $WO_3$, and $Li_2WO_4$, and particularly preferred is $WO_3$, because they are relatively easily available as industrial materials or they contain lithium. These additives 1 may be used alone or in combination of two or more.

The compound (additive 2) having an additive element 2 may be of any type that leads to the effects of the present invention, and is usually boric acid, a salt of an oxoacid, an oxide, or a hydroxide. Preferred among these additives 2 are boric acid and oxides, and particularly preferred is boric acid, because they are inexpensively available as industrial materials.

Examples of the additive 2 include $BO$, $B_2O_2$, $B_2O_3$, $B_4O_5$, $B_6O$, $B_7O$, $B_{13}O_2$, $LiBO_2$, $LiB_5Os$, $Li_2B_4O_7$, $HBO_2$, $H_3BO_3$, $B(OH)_3$, $B(OH)_4$, $BiBO_3$, $Bi_2O_3$, $Bi_2O_5$, and $Bi(OH)_3$. Preferred are $B_2O_3$, $H_3BO_3$, and $Bi_2O_3$, and particularly preferred is $H_3BO_3$, because they are relatively inexpensively and easily available as industrial materials. These additives 2 may be used alone or in combination of two or more.

With respect to the sum of the amounts of the additive 1 and the additive 2 relative to the total molar amount of the transition metal elements constituting the main components, the lower limit thereof is usually 0.1 mol % or more, preferably 0.3 mol % or more, more preferably 0.5 mol % or more, particularly preferably 1.0 mol % or more, whereas the upper limit thereof is usually less than 8 mol %, preferably 5 mol % or less, more preferably 4 mol % or less, particularly preferably 3 mol % or less. If the sum of the amounts thereof is below the lower limit, the effects of the additives may not be possibly achieved. If the sum of the amounts thereof exceeds the upper limit, the battery performance may possibly be impaired.

(Production Method of Positive Electrode Active Material)

The positive electrode active material may be produced by any usual method of producing inorganic compounds. In particular, various methods may be mentioned for producing a spherical or ellipsoidal active material. For example, a material substance of transition metal is dissolved or pulverized and dispersed in a solvent such as water, and the pH of the solution or dispersion is adjusted under stirring to form a spherical precursor. The precursor is recovered and, if necessary, dried. Then, a Li source such as $LiOH$, $Li_2CO_3$, or $LiNO_3$ is added thereto and the mixture is sintered at high temperature, thereby providing an active material.

In order to produce a positive electrode, the aforementioned positive electrode active materials may be used alone or in any combination of two or more having different compositions at any ratio. Preferred examples of the combination in this case include a combination of $LiCoO_2$ and $LiMn_2O_4$ in which part of Mn may optionally be replaced by different transition metal(s) (e.g., $LiNi_{0.33}Co_{0.33}Mn_{0.33}O_2$), and a combination of $LiCoO_2$ in which part of Co may optionally be replaced by different transition metal(s).

(Production Method of Lithium Transition Metal Compound Powder)

The lithium transition metal compound powder may be produced by any method, and may be suitably produced by a production method including: pulverizing and uniformly dispersing a lithium compound, at least one transition metal compound selected from Mn, Co, and Ni, and the aforementioned additive(s) in a liquid medium to provide slurry; spray-drying the resulting slurry; and sintering the resulting spray-dried matter.

For example, in the case of a lithium nickel manganese cobalt complex oxide powder, such a powder can be produced by dispersing a lithium compound, a nickel compound, a manganese compound, a cobalt compound, and the aforementioned additive(s) in a liquid medium to provide slurry, spray-drying the slurry, and sintering the resulting spray-dried matter in an oxygen-containing gas atmosphere.

The following will specifically describe the method of producing a lithium transition metal compound powder by taking, as an example, a production method for a lithium nickel manganese cobalt complex oxide powder that is one preferred embodiment of the present invention.

I) Slurry Preparation Step

In production of the lithium transition metal compound powder, examples of the lithium compound among the material compounds used in the slurry preparation include $Li_2CO_3$, $LiNO_3$, $LiNO_2$, $LiOH$, $LiOH.H_2O$, $LiH$, $LiF$, $LiCl$, $LiBr$, $LiI$, $CH_3OOLi$, $Li_2O$, $Li_2SO_4$, Li dicarboxylate, Li citrate, fatty acid Li, and alkyllithiums. Preferred among these lithium compounds are lithium compounds free from a nitrogen atom, a sulfur atom, and a halogen atom because they do not generate hazardous materials such as $SO_x$ and $NO_x$ in the sintering step, and compounds that are likely to form voids in the secondary particles of the spray-dried powder by, for example, generating decomposed gas during sintering. In consideration of these points, $Li_2CO_3$, $LiOH$, and $LiOH.H_2O$ are preferred, and $Li_2CO_3$ is particularly preferred. These lithium compounds may be used alone or in combination of two or more.

Examples of the nickel compound include $Ni(OH)_2$, $NiO$, $NiOOH$, $NiCO_3$, $2NiCO_3.3Ni(OH)_2.4H_2O$, $NiC_2O_4.2H_2O$, $Ni(NO_3)_2.6H_2O$, $NiSO_4$, $NiSO_4.6H_2O$, fatty acid nickel, and nickel halides. Preferred are nickel compounds such as $Ni(OH)_2$, $NiO$, $NiOOH$, $NiCO_3$, $2NiCO_3.3Ni(OH)_2.4H_2O$, and $NiC_2O_4.2H_2O$ because they do not generate hazardous materials such as $SO_x$ and $NO_x$ in the sintering step. Particularly preferred are $Ni(OH)_2$, $NiO$, $NiOOH$, and $NiCO_3$ because they are inexpensively available as industrial materials and have high reactivity, and also particularly preferred are $Ni(OH)_2$, $NiOOH$, and $NiCO_3$ because they are likely to form voids in the secondary particles of the spray-dried powder by, for example, generating decomposed gas during sintering. These nickel compounds may be used alone or in combination of two or more.

Examples of the manganese compound include manganese oxides such as $Mn_2O_3$, $MnO_2$, and $Mn_3O_4$, manganese salts such as $MnCO_3$, $Mn(NO_3)_2$, $MnSO_4$, manganese acetate, manganese dicarboxylates, manganese citrate, and fatty acid manganese, oxyhydroxides, and halides such as manganese chloride. Preferred among these manganese compounds are $MnO_2$, $Mn_2O_3$, $Mn_3O_4$, and $MnCO_3$ because they do not generate gas such as $SO_x$ and $NO_x$ in the sintering step and are inexpensively available as industrial materials. These manganese compounds may be used alone or in combination of two or more.

Examples of the cobalt compound include $Co(OH)_2$, $CoOOH$, $CoO$, $Co_2O_3$, $Co_3O_4$, $Co(OCOCH_3)_2.4H_2O$, $CoCl_2$, $Co(NO_3)_2.6H_2O$, and $Co(SO_4)_2.7H_2O$, and $CoCO_3$. Preferred among these are $Co(OH)_2$, $CoOOH$, $CoO$, $Co_2O_3$, $Co_3O_4$, and $CoCO_3$ because they do not generate hazardous materials such as $SO_x$ and $NO_x$ in the sintering step. Still more preferred are $Co(OH)_2$ and $CoOOH$ because they are industrially inexpensively available and have high reactivity. In addition, particularly preferred are $Co(OH)_2$, CoOOH, and $CoCO_3$ because they are likely to form voids in the secondary particles of the spray-dried powder by, for example, generating decomposed gas during sintering. These cobalt compounds may be used alone or in combination of two or more.

In addition to the above Li, Ni, Mn, and Co material compounds, the aforementioned additional elements may be introduced by element replacement, or any compound group may be used for the purpose of efficiently forming voids in the secondary particles formed by spray-drying to be mentioned later. The compound to be used for efficiently forming voids in the secondary particles may be added at any stage, and may be added before or after the mixing of the materials in accordance with the properties thereof. In particular, a compound that is likely to be decomposed in the mixing step due to mechanical shearing force is preferably added after the mixing step. The additive(s) is/are as mentioned above.

The materials may be mixed by any method, including wet methods and dry methods. Examples thereof include methods using a device such as a ball mill, a vibrating mill, or a bead mill. Wet mixing in which the material compounds are mixed in a liquid medium such as water or alcohol is preferred because the materials are more uniformly mixed and the reactivity of the mixture in the sintering step is improved.

The mixing time may vary in accordance with the mixing method and may be any period of time as long as the materials are uniformly mixed in the order of the particle level. For example, the mixing time is usually about one hour to two days in the case of using a ball mill (wet or dry method), and the residence time is usually about 0.1 hours to 6 hours in the case of using a bead mill (continual wet method).

In the stage of mixing the materials, the materials are preferably simultaneously pulverized. The degree of pulverization is indicated by the particle size of the pulverized particles of the materials, and the average particle size (median size) is usually 0.6 µm or smaller, preferably 0.55 µm or smaller, still more preferably 0.52 µm or smaller, most preferably 0.5 µm or smaller. Too large an average particle size of the pulverized particles of the materials may lead to low reactivity in the sintering step and difficulty in making the composition uniform. In contrast, pulverizing the materials into excessively small particles may cost high. Thus, the materials have only to be pulverized into particles usually having an average particle size of 0.01 µm or greater, preferably 0.02 µm or greater, still more preferably 0.05 µm or greater. Such a degree of pulverization may be achieved by any means, and wet pulverization is preferred. One specific example thereof is dyno-mill.

The median size of the pulverized particles in the slurry is determined with a known laser diffraction/scattering particle size distribution analyzer at a refractive index of 1.24, the particle size being based on volume. The dispersion medium used in the measurement is a 0.1 wt % sodium hexametaphosphate aqueous solution, and the measurement was performed after a five-minute ultrasonic dispersion (output: 30 W, frequency: 22.5 kHz).

II) Spray-Drying Step

The wet mixing is usually followed by a drying step. The drying may be performed by any method. In order to achieve good uniformity of generated particulates, powder flowability, and powder handleability, and to efficiently produce dried particles, spray drying is preferred.

(Spray-Dried Powder)

In the method of producing a lithium transition metal compound powder such as the above lithium nickel manganese cobalt complex oxide powder, the slurry obtained by wet-pulverizing the material compounds and the aforementioned additive(s) is spray-dried, so that the primary particles coagulate to form secondary particles, resulting in the target powder. The geometric features of the spray-dried powder formed by coagulation of the primary particles into the secondary particles may be analyzed by, for example, SEM observation or cross-sectional SEM observation.

III) Sintering Step

The spray-dried powder obtained in the above spray-drying step is then subjected to a sintering treatment as a sintering precursor.

The sintering conditions depend on the composition and the lithium compound material used. Still, too high a sintering temperature tends to cause excessive growth of the primary particles, excessive sintering of the particles, and too small a specific surface area of the particles. In contrast, too low a sintering temperature tends to cause coexistence of hetero-phases and non-growth of the crystal structure, resulting in an increase in lattice strain. Further, the specific surface area tends to be too large. The sintering temperature is usually 1000° C. or higher, preferably 1010° C. or higher, more preferably 1025° C. or higher, most preferably 1050° C. or higher, while preferably 1250° C. or lower, more preferably 1200° C. or lower, still more preferably 1175° C. or lower.

The sintering may be performed in, for example, a box furnace, a tube furnace, a tunnel furnace, or a rotary kiln. The sintering step is usually divided into three sections, i.e., a temperature-increasing section, a maximum-temperature-keeping section, and a temperature-decreasing section. The second, maximum-temperature-keeping section is not necessarily performed only once, and may be performed twice or more in accordance with the purpose. The step consisting of the temperature-increasing section, the maximum-temperature-keeping section, and the temperature-decreasing section may be repeated twice or more times while a separating step in which the coagulated secondary particles are separated without destruction of the particles, or a pulverizing step in which the coagulated secondary particles are pulverized into the primary particles or much smaller particles is performed between the respective sintering steps.

In the case of two-stage sintering, the temperature in the first stage is preferably kept at a temperature of not lower than the temperature where the Li material starts to decompose but not higher than the temperature where the Li material melts. For example, in the case of using lithium carbonate, the temperature kept in the first stage is preferably 400° C. or higher, more preferably 450° C. or higher, still more preferably 500° C. or higher, most preferably 550° C. or higher, while usually 950° C. or lower, more preferably 900° C. or lower, still more preferably 880° C. or lower, most preferably 850° C. or lower.

In the temperature-increasing section that leads to the maximum-temperature-keeping section, the temperature inside the furnace is usually increased at a temperature-increasing rate of 1° C./min or higher and 20° C./min or lower. Too low a temperature-increasing rate is industrially disadvantageous because the section takes too long a time, but too high a temperature-increasing rate is also not preferred because the temperature inside the furnace fails to follow the set temperature in some furnaces. The temperature-increasing rate is preferably 2° C./min or higher, more preferably 3° C./min or higher, while preferably 18° C./min or lower, more preferably 15° C./min or lower.

The temperature-keeping time in the maximum-temperature-keeping section varies in accordance with the set temperature. If the temperature is within the above range, the temperature-keeping time is usually 15 minutes or longer, preferably 30 minutes or longer, still more preferably 45 minutes or longer, most preferably 1 hour or longer, while usually 24 hours or shorter, preferably 12 hours or shorter, still more preferably 9 hours or shorter, most preferably 6 hours or shorter. Too short a sintering time may fail to provide a lithium transition metal compound powder with good crystallinity. Too long a sintering time is not practical. Too long a sintering time disadvantageously requires post-separation or makes it difficult to perform such post-separation.

In the temperature-decreasing section, the temperature inside the furnace is usually decreased at a temperature-decreasing rate of 0.1° C./min or higher and 20° C./min or lower. Too low a temperature-decreasing rate is industrially disadvantageous because the section takes too long a time, but too high a temperature-decreasing rate tends to cause insufficient uniformity of the target matter or rapid deterioration of the container. The temperature-decreasing rate is preferably 1° C./min or higher, more preferably 3° C./min or higher, while preferably 15° C./min or lower.

An appropriate oxygen partial pressure region varies in accordance with the target composition of a lithium transition metal compound powder. Thus, the sintering atmosphere is any appropriate gas atmosphere satisfying the appropriate oxygen partial pressure region. Examples of the atmospheric gas include oxygen, the air, nitrogen, argon, hydrogen, carbon dioxide, and mixtures of any of these gases. For the lithium nickel manganese cobalt complex oxide powder, an oxygen-containing gas atmosphere, such as the air, may be used. The oxygen concentration in the atmosphere is usually 1 vol % or more, preferably 10 vol % or more, more preferably 15 vol % or more, while usually 100 vol % or less, preferably 50 vol % or less, more preferably 25 vol % or less.

In production of a lithium transition metal compound powder, such as a lithium nickel manganese cobalt complex oxide powder having the above specific composition, by the aforementioned production method under constant production conditions, the mole ratio of Li/Ni/Mn/Co in the target powder can be controlled by adjusting the ratio of mixing the compounds in preparation of slurry containing a lithium compound, a nickel compound, a manganese compound, and a cobalt compound, and an additive(s) dispersed in a liquid medium.

The lithium transition metal compound powder, such as a lithium nickel manganese cobalt complex oxide powder, thus obtained can provide a positive electrode material for lithium secondary batteries having well-balanced performance, i.e., having a high capacity and excellent low-temperature output characteristics and storage characteristics.

<Configuration and Production Method of Positive Electrode>

The following gives the configuration of the positive electrode. The positive electrode may be produced by forming a positive electrode active material layer containing a positive electrode active material and a binding agent on a current collector. The production of a positive electrode with a positive electrode active material may be performed by a usual method. Specifically, a positive electrode active material and a binding agent, and if necessary, other components such as a conductive material and a thickening agent are dry-mixed to provide a sheet, and then this sheet is press-bonded to a positive electrode current collector, or these materials are dissolved or dispersed in a liquid medium to provide slurry, and then this slurry is applied to a positive electrode current collector and dried, so that a positive electrode active material layer is formed on the current collector. Thereby, a positive electrode is obtained.

The amount of the positive electrode active material in the positive electrode active material layer is preferably 80 mass % or more, more preferably 82 mass % or more, particularly preferably 84 mass % or more. The upper limit thereof is preferably 99 mass % or less, more preferably 98 mass % or less. Too small an amount of the positive electrode active material in the positive electrode active material layer may lead to an insufficient electric capacity. In contrast, too large an amount thereof may lead to an insufficient strength of the positive electrode.

(Binding Agent)

The binding agent used in production of the positive electrode active material layer may be any binding agent. In the case of the applying technique, the binding agent has only to be a material that is to be dissolved or dispersed in a liquid medium used in production of the electrode. Specific examples thereof include the same binding agents as those to be used in the above production of the negative electrode. These materials may be used alone or in any combination of two or more at any ratio.

The proportion of the binding agent in the positive electrode active material layer is usually 0.1 mass % or more, preferably 1 mass % or more, more preferably 1.5 mass % or more. The upper limit thereof is usually 80 mass % or less, preferably 60 mass % or less, still more preferably 40 mass % or less, most preferably 10 mass % or less. Too low a proportion of the binding agent may fail to sufficiently hold the positive electrode active material, so that the resulting positive electrode may have an insufficient mechanical strength, resulting in poor battery performance such as cycle characteristics. In contrast, too high a proportion thereof may lead to a decrease in battery capacity and conductivity.

(Slurry-Forming Solvent)

A solvent for forming slurry may be any solvent that can dissolve or disperse the positive electrode active material, the conductive material, and the binding agent, and a thickening agent that is used as necessary. The slurry-forming solvent may be either an aqueous solvent or an organic solvent. Examples of the aqueous medium include water and solvent mixtures of an alcohol and water. Examples of the organic medium include aliphatic hydrocarbons such as hexane; aromatic hydrocarbons such as benzene, toluene, xylene, and methyl naphthalene; heterocyclic compounds such as quinoline and pyridine; ketones such as acetone, methyl ethyl ketone, and cyclohexanone; esters such as methyl acetate and methyl acrylate; amines such as diethylene triamine and N,N-dimethylaminopropylamine; ethers such as diethyl ether, propylene oxide, and tetrahydrofuran (THF); amides such as N-methylpyrrolidone (NMP), dimethyl formamide, and dimethyl acetamide; and aprotic polar solvents such as hexamethyl phospharamide and dimethyl sulfoxide.

(Current Collector)

A positive electrode current collector may be formed from any material, and any known material may be used. Specific examples thereof include metal materials such as aluminum, stainless steel, nickel-plated metals, titanium, and tantalum; and carbon materials such as carbon cloth and carbon paper. Preferred is any metal material, in particular aluminum.

In the case of a metal material, the current collector may be in the form of, for example, metal foil, metal cylinder, metal coil, metal plate, metal film, expanded metal, punched metal, or metal foam. In the case of a carbon material, the current collector may be in the form of, for example, carbon plate, carbon film, or carbon cylinder.

In order to decrease the electric contact resistance between the current collector and the positive electrode active material layer, a conductive assistant may also preferably be applied to a surface of the current collector. Examples of the conductive assistant include carbon and noble metals such as gold, platinum, and silver.

The ratio between the thicknesses of the current collector and the positive electrode active material layer may be any value, and the value "(thickness of positive electrode active material layer on one side immediately before filling of electrolyte solution)/(thickness of current collector)" is preferably 20 or smaller, more preferably 15 or smaller, most preferably 10 or smaller. The lower limit thereof is also preferably 0.5 or greater, more preferably 0.8 or greater, most preferably 1 or greater. If the ratio exceeds this range, the current collector may generate heat due to Joule heat during high-current-density charge and discharge. If the ratio is below the above range, the volume ratio of the current collector to the positive electrode active material is high, so that the battery capacity may be low.

<Separator>

In order to prevent a short circuit, a separator is usually disposed between the positive electrode and the negative electrode. In this case, the electrolyte solution of the present invention is usually impregnated into this separator.

The separator may be formed from any known material and may have any known shape as long as the effects of the present invention are not significantly impaired. The separator is preferably formed from a material stable to the electrolyte solution of the present invention, such as resin, glass fiber, or inorganic matter, and in the form of a porous sheet or a nonwoven fabric which are excellent in a liquid-retaining ability.

Examples of the material of a resin or glass-fiber separator include polyolefins such as polyethylene and polypropylene, aromatic polyamide, polytetrafluoroethylene, polyether sulfone, and glass filters. Particularly preferred are glass filter and polyolefins, still more preferred are polyolefins. These materials may be used alone or in any combination of two or more at any ratio.

The separator may have any thickness, and the thickness is usually 1 μm or larger, preferably 5 μm or larger, more preferably 8 μm or larger, while usually 50 μm or smaller, preferably 40 μm or smaller, more preferably 30 μm or smaller. The separator thinner than the above range may have poor insulation and mechanical strength. The separator thicker than the above range may lead to not only poor battery performance, such as rate characteristics, but also a low energy density of the whole electrochemical device.

If the separator is a porous one such as a porous sheet or a nonwoven fabric, the separator may have any porosity. The porosity is usually 20% or higher, preferably 35% or higher, more preferably 45% or higher, whereas the porosity is usually 90% or lower, preferably 85% or lower, more preferably 75% or lower. The separator having a porosity of lower than the above range tends to cause a high film resistance and poor rate characteristics. The separator having a porosity of higher than the above range tends to have a low mechanical strength and poor insulation.

The separator may also have any average pore size. The average pore size is usually 0.5 μm or smaller, preferably 0.2 μm or smaller, while usually 0.05 μm or larger. The separator having an average pore size exceeding the above range may easily cause a short circuit. The separator having an average pore size of lower than the above range may have a high film resistance and lead to poor rate characteristics.

Examples of the inorganic matter include oxides such as alumina and silicon dioxide, nitrides such as aluminum nitride and silicon nitride, and sulfates such as barium sulfate and calcium sulfate. The inorganic matter is in the form of particles or fibers.

The separator is in the form of a thin film such as a nonwoven fabric, a woven fabric, or a microporous film. The thin film favorably has a pore size of 0.01 to 1 μm and a thickness of 5 to 50 μm. Instead of the above independent thin film, the separator may have a structure in which a composite porous layer containing particles of the above inorganic matter is disposed on a surface of one or both of the positive and negative electrodes using a resin binding agent. For example, alumina particles having a 90% particle size of smaller than 1 μm are applied to both surfaces of the positive electrode with fluororesin used as a binding agent to form a porous layer.

The following will describe the battery design.

<Electrode Group>

The electrode group may be either a laminated structure including the above positive and negative electrode plates with the above separator in between, or a wound structure including the above positive and negative electrode plates in spiral with the above separator in between. The proportion of the volume of the electrode group in the battery internal volume (hereinafter, referred to as an electrode group occupancy) is usually 40% or higher, preferably 50% or higher, while usually 90% or lower, preferably 80% or lower.

The electrode group occupancy of lower than the above range may lead to a low battery capacity. The electrode group occupancy exceeding the above range may lead to small space for voids. Thus, when the battery temperature rises to high temperature, the components may expand or the liquid fraction of the electrolyte may show a high vapor pressure, so that the internal pressure may rise. As a result, the battery characteristics such as charge and discharge repeatability and the high-temperature storageability may be impaired, and a gas-releasing valve for releasing the internal pressure toward the outside may work.

<Current-Collecting Structure>

The current-collecting structure may be any structure. In order to more effectively improve the high-current-density charge and discharge characteristics by the electrolyte solution of the present invention, the current-collecting structure is preferably a structure which can reduce the resistances at wiring portions and jointing portions. With such low internal resistances, the effects of using the electrolyte solution of the present invention can particularly favorably be achieved.

In an electrode group having the layered structure, the metal core portions of the respective electrode layers are preferably bundled and welded to a terminal. If the area of a single electrode is large, the internal resistance is high. Thus, multiple terminals may preferably be formed in the electrode to decrease the resistance. In an electrode group having the wound structure, multiple lead structures may be disposed on each of the positive electrode and the negative electrode and bundled to a terminal. Thereby, the internal resistance can be decreased.

<External Case>

The external case may be made of any material that is stable to an electrolyte solution to be used. Specific examples thereof include metals such as nickel-plated steel plates, stainless steel, aluminum and aluminum alloys, and magnesium alloys, and a layered film (laminate film) of resin and aluminum foil. In order to reduce the weight, a metal such as aluminum or an aluminum alloy or a laminate film is favorably used.

External cases made of metal may have a sealed-up structure formed by welding the metal by laser welding, resistance welding, or ultrasonic welding or a caulking structure using the metal via a resin gasket. External cases made of a laminate film may have a sealed-up structure formed by hot melting the resin layers. In order to improve the sealability, a resin which is different from the resin of the laminate film may be disposed between the resin layers. Especially, in the case of forming a sealed-up structure by heat melting the resin layers via current collecting terminals, metal and resin are to be bonded. Thus, the resin to be disposed between the resin layers is favorably a resin having a polar group or a modified resin having a polar group introduced thereinto.

<Protective Element>

Any of positive temperature coefficient (PTC) thermistors the resistance of which increases in case of abnormal heating or excessive current flow, thermal fuses, thermistors, and valves (current-breaking valves) that break the current flowing in a circuit in response to a rapid increase in pressure or temperature inside the battery in case of abnormal heating may be used as a protective element. The protective element is preferably selected from elements that do not work under normal use at high currents. The battery is more preferably designed so as to cause neither abnormal heating nor thermal runaway even without a protective element.

<External Housing>

The electrochemical device of the present invention usually includes the electrolyte solution, the negative electrode, the positive electrode, the separator, and other components contained in an external housing. This external housing may be any known housing as long as the effects of the present invention are not significantly impaired. Specifically, the external housing may be formed of any material, and is usually formed of, for example, nickel-plated iron, stainless steel, aluminum or alloy thereof, nickel, or titanium.

The external housing may be in any form, and may be in the form of a cylinder, a square, a laminate, a coin, or a large size, for example. The shapes and the configurations of the positive electrode, the negative electrode, and the separator may be changed in accordance with the shape of the battery.

As mentioned above, the electrolyte solution of the present invention suppresses generation of gas and is excellent in battery characteristics. Thus, the electrolyte solution is especially useful as an electrolyte solution for electrochemical devices such as large-size lithium ion secondary batteries for hybrid vehicles or distributed generation, as well as useful as an electrolyte solution for electrochemical devices such as small-size lithium ion secondary batteries. A module including the lithium ion secondary battery of the present invention is also one aspect of the present invention.

The present invention also relates to an electric double-layer capacitor including a positive electrode, a negative electrode, and the aforementioned electrolyte solution.

In the electric double-layer capacitor of the present invention, at least one of the positive electrode and the negative electrode is a polarizable electrode. Examples of the polarizable electrode and a non-polarizable electrode include the following electrodes specifically disclosed in JP H09-7896 A.

The polarizable electrode mainly containing activated carbon used in the present invention is preferably one containing inactivated carbon having a large specific surface area and a conductive material, such as carbon black, providing electronic conductivity. The polarizable electrode can be formed by any of various methods. For example, a polarizable electrode containing activated carbon and carbon black can be produced by mixing activated carbon powder, carbon black, and phenolic resin, press-molding the mixture, and then firing and activating the mixture in an inert gas atmosphere and water vapor atmosphere. Preferably, this polarizable electrode is bonded to a current collector using a conductive adhesive, for example.

Alternatively, a polarizable electrode can also be formed by kneading activated carbon powder, carbon black, and a binder in the presence of alcohol and forming the mixture into a sheet shape, and then drying the sheet. This binder may be polytetrafluoroethylene, for example. Alternatively, a polarizable electrode integrated with a current collector can be produced by mixing activated carbon powder, carbon black, a binder, and a solvent to form slurry, and applying this slurry to metal foil of a current collector, and then drying the slurry.

The electric double-layer capacitor may have polarizable electrodes mainly containing activated carbon on the respective sides. Still, the electric double-layer capacitor may have a non-polarizable electrode on one side, for example, a positive electrode mainly containing an electrode active material such as a metal oxide and a negative electrode which is a polarizable electrode mainly containing activated carbon may be combined; or a negative electrode mainly containing a carbon material that can reversibly occlude and release lithium ions or a negative electrode of lithium metal or lithium alloy and a polarizable positive electrode mainly containing activated carbon may be combined.

In place of or in combination with activated carbon, any carbonaceous material such as carbon black, graphite, expanded graphite, porous carbon, carbon nanotube, carbon nanohorn, and Kethenblack may be used.

The non-polarizable electrode is preferably an electrode mainly containing a carbon material that can reversibly occlude and release lithium ions, and this carbon material is made to occlude lithium ions in advance. In this case, the electrolyte used is a lithium salt. The electric double-layer capacitor having such a configuration achieves a much higher withstand voltage exceeding 4 V.

The solvent used in preparation of slurry in the production of electrodes is preferably one that dissolves a binder. In accordance with the type of a binder, N-methylpyrrolidone, dimethyl formamide, toluene, xylene, isophorone, methyl ethyl ketone, ethyl acetate, methyl acetate, dimethyl phthalate, ethanol, methanol, butanol, or water is appropriately selected.

Examples of the activated carbon used for the polarizable electrode include phenol resin-type activated carbon, coconut shell-type activated carbon, and petroleum coke-type activated carbon. In order to achieve a large capacity, petroleum coke-type activated carbon or phenol resin-type activated carbon is preferably used. Examples of methods of activating the activated carbon include steam activation and molten KOH activation. In order to achieve a larger capacity, activated carbon prepared by molten KOH activation is preferably used.

Preferred examples of the conductive material used for the polarizable electrode include carbon black, Ketjenblack, acetylene black, natural graphite, artificial graphite, metal fiber, conductive titanium oxide, and ruthenium oxide. In order to achieve good conductivity (i.e., low internal resistance), and because too large an amount thereof may lead to a decreased capacity of the product, the amount of the conductive material such as carbon black used for the polarizable electrode is preferably 1 to 50 mass % in the sum of the amounts of the activated carbon and the conductive material.

In order to provide an electric double-layer capacitor having a large capacity and a low internal resistance, the activated carbon used for the polarizable electrode preferably has an average particle size of 20 μm or smaller and a specific surface area of 1500 to 3000 m$^2$/g. Preferred examples of the carbon material for providing an electrode mainly containing a carbon material that can reversibly occlude and release lithium ions include natural graphite, artificial graphite, graphitized mesocarbon microsphere, graphitized whisker, vapor-grown carbon fiber, sintered furfuryl alcohol resin, and sintered novolak resin.

The current collector may be any chemically and electrochemically corrosion-resistant one. Preferred examples of the current collector used for the polarizable electrode mainly containing activated carbon include stainless steel, aluminum, titanium, and tantalum. Particularly preferred materials in terms of the characteristics and cost of the resulting electric double-layer capacitor are stainless steel and aluminum. Preferred examples of the current collector used for the electrode mainly containing a carbon material that can reversibly occlude and release lithium ions include stainless steel, copper, and nickel.

The carbon material that can reversibly occlude and release lithium ions can be allowed to occlude lithium ions in advance by (1) a method of mixing powdery lithium to a carbon material that can reversibly occlude and release lithium ions, (2) a method of placing lithium foil on an electrode containing a carbon material that can reversibly occlude and release lithium ions and a binder so that the lithium foil is electrically in contact with the electrode, immersing this electrode in an electrolyte solution containing a lithium salt dissolved therein so that the lithium is ionized, and allowing the carbon material to take in the resulting lithium ions, or (3) a method of placing an electrode containing a carbon material that can reversibly occlude and release lithium ions and a binder at a minus side and placing a lithium metal at a plus side, immersing the electrodes in a non-aqueous electrolyte solution containing a lithium salt as an electrolyte, and supplying a current so that the carbon material is allowed to electrochemically take in the ionized lithium.

Examples of known electric double-layer capacitors include wound electric double-layer capacitors, laminated electric double-layer capacitors, and coin-type electric double-layer capacitors. The electric double-layer capacitor in the present invention may also be any of these types.

For example, a wound electric double-layer capacitor is assembled by winding a positive electrode and a negative electrode each of which includes a laminate (electrode) of a current collector and an electrode layer, and a separator in between to provide a wound element, putting this wound element in a case made of, for example, aluminum, filling the case with an electrolyte solution, preferably a non-aqueous electrolyte solution, and sealing the case with a rubber sealant.

In the present invention, a separator formed from a conventionally known material and having a conventionally known structure can also be used. Examples thereof include polyethylene porous membranes, and nonwoven fabric of polypropylene fiber, glass fiber, or cellulose fiber.

In accordance with any known method, the capacitor may be formed into a laminated electric double-layer capacitor in which a sheet-like positive electrode and negative electrode are stacked with an electrolyte solution and a separator in between or a coin-type electric double-layer capacitor in which a positive electrode and a negative electrode are fixed by a gasket with an electrolyte solution and a separator in between.

The electrolyte solution of the present invention is useful as an electrolyte solution for large-size lithium ion secondary batteries for hybrid vehicles or distributed generation, and for electric double-layer capacitors.

EXAMPLES

The present invention will be described referring to, but not limited to, examples.

Examples 1 to 13, Comparative Examples 1 to 4

Preparation of Electrolyte Solution

The components of the solvent and the sulfur-containing compound were mixed at a composition shown in Table 1. To this mixture was added LiPF$_6$ such that the concentration thereof was 1.0 mol/L. Thereby, a non-aqueous electrolyte solution was prepared.

The proportion of the sulfur-containing compound was expressed by mass % relative to the electrolyte solution.

The compounds shown in the tables are as follows.
 a: CH$_3$CH$_2$OCOOCH$_2$CF$_3$ (fluorine content: 33.1%)
 b: CF$_3$CH$_2$OCOOCH$_3$ (fluorine content: 36.1%)
 c: CF$_3$CH$_2$OCOOCH$_2$CF$_3$ (fluorine content: 50.4%)
 d: (C$_3$F$_7$OCF(CF$_3$)CH$_2$O)$_2$CO (fluorine content: 65.1%)
 e: HCF$_2$CH$_2$OCOOCH$_3$ (fluorine content: 27.1%)
 FEC: monofluoroethylene carbonate
 DEC: diethyl carbonate
 EC: ethylene carbonate
 PRS: 1,3-propene sultone
 Me-PRS: 3-methyl-1,3-propene sultone
 DTD: 1,3,2-dioxathiolane 2,2-dioxide (Production of Monolayer Battery)

LiNi$_{0.5}$Mn$_{1.5}$O$_4$, carbon black, and polyvinylidene fluoride (trade name: KF-7200, Kureha Chemical Industry Co., Ltd.) were mixed at a ratio of 92/3/5 (mass ratio) to provide a positive electrode active material. This positive electrode active material was dispersed in N-methyl-2-pyrrolidone so as to be in the form of slurry. Thereby, a positive electrode mixture slurry was prepared. The resulting positive electrode mixture slurry was uniformly applied onto an aluminum current collector, and then dried to form a positive electrode mixture layer (thickness: 100 μm). Thereafter, the workpiece was compression molded using a roll press, and thereby a positive electrode laminate was produced. The positive electrode laminate was punched into a size of 3.0 mm×4.0 mm using a punching machine, and thereby a positive electrode was produced.

Separately, styrene-butadiene rubber dispersed in distilled water was added to artificial graphite powder such that the solid content was 1 mass %. The components were mixed using a disperser to be in the form of slurry. This slurry was uniformly applied onto a negative electrode current collector (copper foil having a thickness of 10 μm), and then dried to form a negative electrode mixture layer. Thereafter, the workpiece was compression molded using a roll press, and the compression-molded article was punched into a size of 3.2 mm×4.2 mm using a punching machine. Thereby, a negative electrode was produced.

The negative electrode and positive electrode produced as mentioned above and a polypropylene separator were stacked in the order of the negative electrode, the separator, and the positive electrode, whereby a battery element was produced.

This battery element was inserted into a bag made from a laminate film consisting of an aluminum sheet (thickness: 40 μm) and resin layers covering the respective faces of the sheet, with the terminals of the positive electrode and the negative electrode protruding from the bag. Then, the bag was charged with one of the electrolyte solutions of the examples and the comparative examples and vacuum-sealed. Thereby, a sheet-like lithium ion secondary battery was produced.

(Determination of Battery Characteristics)

For the resulting monolayer lithium ion secondary battery, the high-temperature cycle characteristics and the high-temperature storage characteristics were determined as follows.

(Charge and Discharge Conditions)

Charge: 0.5 C, 4.85 V, maintained until the charge current reached 1/10 C (CC.CV charge)

Discharge: 0.5 C, 3.0 V cut (CC discharge)

(High-Temperature Cycle Characteristics)

With respect to the high-temperature cycle test, charge and discharge were performed 100 times under the above charge and discharge conditions at 60° C., whereby the high-temperature cycle characteristics were determined. The capacity retention ratio was calculated by the following formula. Table 1 shows the results.

$$\text{Capacity retention ratio (\%)} = \frac{\text{Discharge capacity after 100 cycles (mAh)}}{\text{Discharge capacity after 5 cycles (mAh)}} \times 100$$

(High-Temperature Storage Characteristics)

With respect to the high-temperature storage characteristics, the battery was charged and discharged under predetermined charge and discharge conditions (charged at 0.5 C and a predetermined voltage until the charge current reached 1/10 C, and discharged at a current corresponding to 0.5 C until the voltage reached 3.0 V), and the discharge capacity thereof was determined. Thereafter, the battery was charged again under the same charge conditions, and stored for 7 days in a temperature-constant container at 60° C. The battery after the storage was discharged at 25° C. until the voltage reached an end-of-discharge voltage of 3 V under the above discharge conditions, and the residual capacity was determined. The battery was further charged under the above charge conditions and discharged under the above discharge conditions at a constant current until the voltage reached an end-of-discharge voltage of 3 V. Thereby, the recovery capacity was determined. The measured residual capacity retention ratio and recovery capacity retention ratio were determined by the following formulas. Table 1 shows the results.

Residual capacity retention ratio (%)=Residual capacity/Discharge capacity before high-temperature storage×100

Recovery capacity retention ratio (%)=Recovery capacity/Discharge capacity before high-temperature storage×100

TABLE 1

| | Examples | | | | | | | | | | | | | Comparative Examples | | | |
|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 1 | 2 | 3 | 4 |
| Electrolyte solution Solvent composition | | | | | | | | | | | | | | | | | |
| Type | FEC | FEC | FEC | FEC | FEC | FEC | FEC + EC | FEC | FEC | FEC | FEC | FEC | FEC | EC | FEC | FEC | FEC |
| Proportion (vol %) | 30 | 30 | 30 | 30 | 30 | 30 | 10 + 20 | 10 | 60 | 30 | 30 | 3 | 97 | 30 | 30 | 30 | 30 |
| Type | a | b | b | b | c | b + d | b + DEC | a | a | b | b | b | b | DEC | DEC | b | e |
| Proportion (vol %) | 70 | 70 | 70 | 70 | 70 | 60 + 10 | 20 + 50 | 90 | 40 | 70 | 70 | 97 | 3 | 70 | 70 | 70 | 70 |
| Sulfur-containing compound | | | | | | | | | | | | | | | | | |
| Type | PRS | PRS | PRS | PRS | PRS | PRS | PRS | PRS | PRS | Me-PRS | DTD | PRS | PRS | PRS | PRS | — | PRS |
| Proportion (vol %) | 2 | 2 | 0.1 | 10 | 2 | 2 | 2 | 2 | 2 | 2 | 2 | 2 | 2 | 2 | 2 | — | 2 |
| Electrolyte salt | | | | | | | | | | | | | | | | | |
| $LiPF_6$ Proportion (mol/L) | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 |
| High-temperature cycle characteristics (%) | 75.6 | 77.6 | 74.1 | 75.1 | 74.2 | 76.7 | 72.2 | 75.0 | 76.1 | 73.3 | 71.6 | 73.4 | 72.6 | 36.0 | 39.7 | 66.7 | 53.4 |

TABLE 1-continued

| | Examples | | | | | | | | | | | | | Comparative Examples | | | |
|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 1 | 2 | 3 | 4 |
| High-temperature storage characteristics (residual capacity) (%) | 75.1 | 80.2 | 75.9 | 77.1 | 77.7 | 78.0 | 73.0 | 73.5 | 73.6 | 75.2 | 71.2 | 74.7 | 74.4 | 50.1 | 52.7 | 70.1 | 60.1 |
| High-temperature storage characteristics (recovery capacity) (%) | 83.4 | 86.8 | 82.2 | 83.1 | 83.9 | 86.1 | 80.9 | 80.6 | 80.8 | 85.1 | 78.5 | 80.2 | 79.8 | 58.8 | 61.2 | 75.1 | 73.8 |

The invention claimed is:

1. An electrolyte solution comprising
a solvent containing a fluorinated saturated cyclic carbonate and a fluorinated acyclic carbonate;
at least one sulfur-containing compound selected from the group consisting of 1,3,2-dioxathiolane 2,2-dioxide and an unsaturated sultone represented by the following formula (1):

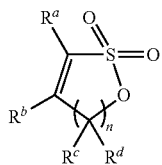

wherein $R^a$ to $R^d$ may be the same as or different from each other, and are each a hydrogen atom, a fluorine atom, or a C1-C12 hydrocarbon group which may optionally have a fluorine atom; and n is an integer of 0 to 3; and
an electrolyte salt,
the fluorinated acyclic carbonate having a fluorine content of 31.0 to 70.0 mass %,
wherein the proportion of the fluorinated saturated cyclic carbonate is 20 to 40 vol % and the proportion of the fluorinated acyclic carbonate is 60 to 80 vol % relative to the solvent, and
the amount of the sulfur-containing compound is 1 to 3 mass % relative to the electrolyte solution.

2. The electrolyte solution according to claim 1, wherein the sulfur-containing compound is the unsaturated sultone represented by formula (1).

3. An electrochemical device comprising the electrolyte solution according to claim 1.

4. A module comprising the electrochemical device according to claim 3.

5. A lithium ion secondary battery comprising the electrolyte solution according to claim 1.

6. A module comprising the lithium ion secondary battery according to claim 5.

* * * * *